United States Patent
Van der Auwera et al.

(10) Patent No.: US 12,400,374 B2
(45) Date of Patent: Aug. 26, 2025

(54) GPCC PLANAR MODE AND BUFFER SIMPLIFICATION

(71) Applicant: QUALCOMM Incorporated, San Diego, CA (US)

(72) Inventors: Geert Van der Auwera, Del Mar, CA (US); Adarsh Krishnan Ramasubramonian, Irvine, CA (US); Bappaditya Ray, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 495 days.

(21) Appl. No.: 17/480,423

(22) Filed: Sep. 21, 2021

(65) Prior Publication Data

US 2022/0108492 A1   Apr. 7, 2022

Related U.S. Application Data

(60) Provisional application No. 63/088,156, filed on Oct. 6, 2020.

(51) Int. Cl.
G06T 9/40 (2006.01)
H04N 19/91 (2014.01)

(52) U.S. Cl.
CPC ...... *G06T 9/40* (2013.01); *G06T 2207/10028* (2013.01); *H04N 19/91* (2014.11)

(58) Field of Classification Search
None
See application file for complete search history.

(56) References Cited

U.S. PATENT DOCUMENTS 10,693,492 B1 * 6/2020 Lasserre ............ H04N 19/96
2011/0115812 A1   5/2011 Minear et al.
(Continued)

FOREIGN PATENT DOCUMENTS

WO   WO-2020145139 A1   7/2020

OTHER PUBLICATIONS

Auwera G.V.D., et al., "[GPCC] [New] Planar and Azimuthal Coding Mode Simplifications", 131. MPEG Meeting, Jun. 29, 2020-Jul. 3, 2020, Online, (Motion Picture Expert Group or ISO/IEC JTC1/SC29/WG11), No. m54694, Jul. 1, 2020 (Jul. 1, 2020), XP030289263, 7 Pages, Retrieved from the Internet: URL: http://phenix.int-evry.fr/mpeg/doc_enduser/documents/131_Online/wg11/m54694-v3-m54694-v3.zip m54694-planar-and-azimuthal-modes-ctx-red_v2.docx. [Retrieved on Jul. 1, 2020].

(Continued)

*Primary Examiner* — Vincent Rudolph
*Assistant Examiner* — Meredith Taylor
(74) *Attorney, Agent, or Firm* — Shumaker & Sieffert, P.A.

(57) ABSTRACT

A method of encoding point cloud data comprises storing, in a buffer, a maximum coordinate of a pair of coordinates of an applicable node, wherein the applicable node is a most-recently encoded node with a same position as a current node along an applicable axis and the pair of coordinates are for axes different from the applicable axis; determining a context for a planar mode plane position of the current node, wherein determining the context for the planar mode plane position comprises determining, based on the maximum coordinate of the pair of coordinates of the applicable node, a distance value representing a distance between the current node and the applicable node; determining an increment value that indicates whether the distance value is greater than a threshold; and determining the context index based on (Continued)

the increment value; and entropy encoding the planar mode plane position using the determined context.

37 Claims, 10 Drawing Sheets

(56) References Cited

U.S. PATENT DOCUMENTS

| | | | |
|---|---|---|---|
| 2019/0311499 | A1* | 10/2019 | Mammou ................. G06T 7/50 |
| 2020/0288159 | A1 | 9/2020 | Van Der Auwera et al. |
| 2020/0413080 | A1 | 12/2020 | Lasserre et al. |
| 2021/0012539 | A1 | 1/2021 | Zhang et al. |
| 2021/0103780 | A1 | 4/2021 | Mammou et al. |
| 2021/0407143 | A1 | 12/2021 | Van Der Auwera |
| 2023/0048381 | A1 | 2/2023 | Taquet et al. |
| 2023/0065156 | A1 | 3/2023 | Yang et al. |
| 2023/0162402 | A1 | 5/2023 | Zhang et al. |
| 2023/0316586 | A1 | 10/2023 | Wan et al. |

OTHER PUBLICATIONS

Auwera (Qualcomm) G., et al., "[G-PCC] [New proposal] Planar Mode Simplifications", 132. MPEG Meeting, Oct. 12, 2020-Oct. 16, 2020, Online, (Motion Picture Expert Group or ISO/IEC JTC1/SC29/WG11), No. m55379, Oct. 13, 2020, 11 Pages, XP030291892.

Asserre (Blackberry) S., et al., "The Azimuthal Coding Mode", [GPCC][CE13.22 related], 129. MPEG Meeting, Jan. 13, 2020-Jan. 17, 2020, Brussels, (Motion Picture Expert Group or ISO/IEC JTC1/SC29/WG11), No. m51596, Jan. 8, 2020, XP030224661, 31 Pages.

Lasserre S., et al., "m48906_Planar Mode in Octree-Based Geometry Coding", 127. MPEG Meeting, Jul. 8, 2019-Jul. 12, 2019, Gothenburg, (Motion Picture Expert Group or ISO/IEC JTC1/WG11) No. m48906, Jul. 3, 2019 (Jul. 3, 2019), XP030222328, 33 Pages, Retrieved from the Internet: URL:http://phenix.int-evry.fr/mpeg/doc_end_user/documents/127_Gothenburg/wg11/m48906-v1-m48906_Planarmodeinoctree-basedgeometrycoding.zip [retrieved on Jul. 3, 2019].

Taquet (Blackberry) J., et al., "[G-PCC] [CE13.22 Related] Planar mode Buffer Optimization", 129. MPEG Meeting, Jan. 13, 2020-Jan. 17, 2020, Brussels, (Motion Picture Expert Group or ISO/IEC JTC1/SC29/WG11), No. m52345, Jan. 8, 2020, 7 Pages, XP030224981.

"Text of ISO/IEC 23090-9 DIS Geometry-Based Point Cloud Compression", 129. MPEG Meeting, Jan. 13, 2020- Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on-Apr. 20, 2020].

Anonymous: "Euclidean vs Chebyshev vs Manhattan Distance", May 22, 2012 (May 22, 2012), pp. 1-4, XP055873158, Retrieved from the Internet: URL: https://1yfat.wordpress.com/2012/05/22/euclidean-vs-chebyshev-vs-manhattan-distance/ [retrieved on Dec. 15, 2021].

International Search Report and Written Opinion—PCT/US2021/051560—ISA/EPO—Dec. 23, 2021.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Sze V., et al., "Entropy Coding in HEVC" In: "High Efficiency Video Coding (HEVC)" Algorithms and Architectures—Chapter 8: Entropy Coding in HEVC, Springer International Publishing, Jan. 1, 2014 (Jan. 1, 2014), pp. 209-274, XP55263413, XP055594371, ISBN: 978-3-319-06894-7, DOI: 10.1007/978-3-319-06895-4_8, Section 8.6.4.2, Section 3.6.4.4, figure 8.21, table 8.9, 8.10, paragraph [8.8.3.1].

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

3DG: "G-PCC Future Enhancements", International Organisation for Standardisation Organisation Internationale De Normalisation, ISO/IEC JTC 1/SC 29/WG 11 Coding of Moving Pictures and Audio, ISO/IEC JTC 1/SC 29/WG 11, N18887, Geneva, CH—Oct. 2019, 128. MPEG Meeting, Oct. 7, 2019-Oct. 11, 2019, Geneva, (Motion Picture Expert Group or ISO/IEC JTC1/SC29/WG11), No. n18887, Dec. 23, 2019, XP030225587, 277 Pages.

Co-pending U.S. Appl. No. 18/627,002, filed Apr. 4, 2024.

Lasserre S. (Blackberry)., et al., "m48906_Planar Mode in Octree-Based Geometry Coding", 127. MPEG Meeting, Jul. 8, 2019-Jul. 12, 2019, Gothenburg, Sweden, (Motion Picture Expert Group or ISO/IEC JTC1/SC29/WG11 MPEG2018), No. m48906, Jul. 3, 2019, 33 Pages, XP030222328.

Taiwan Search Report—TW110135199—TIPO—Nov. 30, 2024.

ISO/IEC: "Information Technology-MPEG-I (Coded Representation of Immersive Media)-Part 9: Geometry-based Point Cloud Compression ", MPEG, Text of ISO/IEC 23090-9 DIS Geometry-based PCC.MPEG 129. w19088, Jan. 7, 2020, 128 pages, Section 1-9.7.3.

* cited by examiner

GPCC PLANAR MODE AND BUFFER SIMPLIFICATION

This application claims the benefit of U.S. Provisional Patent Application 63/088,156, filed Oct. 6, 2020, the entire content of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques related to contexts and buffers for planar mode for Geometry Point Cloud Compression (G-PCC), such as the G-PCC standard that is being developed within the Motion Pictures Experts Group (MPEG) by the 3-dimensional graphics (3DG) group. For example, a G-PCC coder (e.g., a G-PCC encoder or a G-PCC decoder) may store a maximum coordinate of a pair of coordinates of an applicable node. The applicant node may be a most-recently coded node with a same position as a current node along an applicable axis. The pair of coordinates are for axes different from the applicable axis. Additionally, the G-PCC coder may determine a context for a planar mode plane position of the current node. The planar mode plane position indicates a position of a plane that is normal to the applicable axis. As part of determining the context for the planar mode plane position, the G-PCC coder may determine, based on the maximum coordinate of the pair of coordinates of the applicable node and a greater coordinate of a pair of coordinates of the current node along the axes different from the applicable axis, a distance value representing a distance between the current node and the applicable node. The G-PCC coder may then determine an increment value that indicates whether the distance value is greater than a threshold. The G-PCC coder may then determine the context index based on the increment value. The G-PCC coder may entropy code the planar mode plane position using the determined context. By storing the maximum coordinate of the coordinates of the applicable node, instead of two or more of the coordinates of the applicable node, complexity of the context derivation process and the size of the buffer may be reduced.

In one example, this disclosure describes a method of encoding point cloud data, the method comprising: storing, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; determining, from among a plurality of contexts, a context for a planar mode plane position of the current node, wherein determining the context for the planar mode plane position comprises determining a context index that indicates the context, wherein determining the context index comprises: determining, based on the maximum coordinate of the pair of coordinates of the applicable node stored in the buffer and a greater coordinate of a pair of coordinates of the current node along the axes different from the applicable axis, a distance value representing a distance between the current node and the applicable node; determining an increment value that indicates whether the distance value is greater than a threshold; and determining the context index based on the increment value; and entropy encoding the planar mode plane position using the determined context.

In another example, this disclosure describes a method of decoding point cloud data, the method comprising: storing, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; determining, from among a plurality of contexts, a context for a planar mode plane position of the current node, wherein determining the context for the planar mode plane position comprises determining a context index that indicates the context, wherein determining the context index comprises: determining, based on the maximum coordinate of the pair of coordinates of the applicable node and a greater coordinate of a pair of coordinates of the current node along the axes different from the applicable axis, a distance value representing a distance between the current node and the applicable node; determining an increment value that indicates whether the distance value is greater than a threshold; and determining the context index based on the increment value; and entropy decoding the planar mode plane position using the determined context.

In another example, this disclosure describes a device for encoding point cloud data, the device comprising: a buffer configured to store a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; and one or more processors implemented in circuitry, the one or more processors configured to: determine, from among a plurality of contexts, a context for a planar mode plane position of the current node, wherein the one or more processors are configured to, as part of determining the context for the planar mode plane position, determine a context index that indicates the context, and the one or more processors arc configured to, as part of determining the context index: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy encode the planar mode plane position using the determined context.

In another example, this disclosure describes a device for decoding point cloud data, the device comprising a buffer configured to store a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; and one or more processors implemented in circuitry, the one or more processors configured to: determine, from among a plurality of contexts, a context for a planar mode plane position of the current node, wherein the one or more processors are configured to, as part of determining the context for the planar mode plane position, determine a context index that indicates the context, and the one or more processors are configured to, as part of determining the context index: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy decode the planar mode plane position using the determined context.

In another example, this disclosure describes a device for encoding point cloud data, the device comprising: means for storing a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; means for determining, from among a plurality of contexts, a context for a planar mode plane position of the current node, wherein the means for determining the context for the planar mode plane position of the current node comprises means for determining a context index that indicates the context, and the means for determining the context index comprises: means for determining, based on the maximum coordinate of the pair of coordinates of the applicable node and a greater coordinate of a pair of coordinates of the current node along the axes different from the applicable axis, a distance value representing a distance between the current node and the applicable node; means for determining an increment value that indicates whether the distance value is greater than a threshold; and means for determining the context index based on the increment value; and means for entropy encoding the planar mode plane position using the determined context.

In another example, this disclosure describes a device for decoding point cloud data, the device comprising: means for storing a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; means for determining, from among a plurality of contexts, a context for a planar mode plane position of the current node, wherein the means for determining the context for the planar mode plane position of the current node comprises means for determining a context index that indicates the context, and the means for determining the context index comprises: means for determining, based on the maximum coordinate of the pair of coordinates of the applicable node and a greater coordinate of a pair of coordinates of the current node along the axes different from the applicable axis, a distance value representing a distance between the current node and the applicable node; means for determining an increment value that indicates whether the distance value is greater than a threshold; and means for determining the context index based on the increment value; and means for entropy decoding the planar mode plane position using the determined context.

In another example, this disclosure describes a computer-readable storage medium having stored thereon instructions that, when executed, cause one or more processors to: store, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy encode the planar mode plane position using the determined context.

In another example, this disclosure describes a computer-readable storage medium having stored thereon instructions that, when executed, cause one or more processors to: store, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to: determine, based on the maximum coordinate of the pair of coordinates of the applicable node stored in the buffer and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy decode the planar mode plane position using the determined context.

In another example, this disclosure describes a method of coding point cloud data, the method comprising: determining a context for a planar mode plane position from a plurality of contexts, wherein determining the context for the planar mode comprises determining, without checking a neighbor occupancy, a context index that indicates the context; entropy coding the planar mode plane position using the determined context, and coding at least one point in a point cloud data based on the planar mode plane position.

In another example, this disclosure describes a method of coding point cloud data, the method comprising: determining a context for a planar mode plane position from a plurality of contexts, wherein determining the context for the planar mode comprises determining a context index that indicates the context, wherein determining the context index comprises: determining a distance value representing a distance between a current node and a most-recently coded node position with a same position as the current node along an axis; determining an increment value that indicates whether the distance value is greater than a threshold; and determining the context index based on the increment value; entropy coding the planar mode plane position using the determined context; and coding at least one point in a point cloud data based on the planar mode plane position.

In other examples, this disclosure describes devices for processing point cloud data, the device comprising one or more means for performing the methods of this disclosure. This disclosure also describes a computer-readable storage medium having stored thereon instructions for causing one or more processors to perform the methods of this disclosure.

The details of one or more examples are set forth in the accompanying drawings and the description below. Other features, objects, and advantages will be apparent from the description, drawings, and claims.

DETAILED DESCRIPTION

Figure 1:
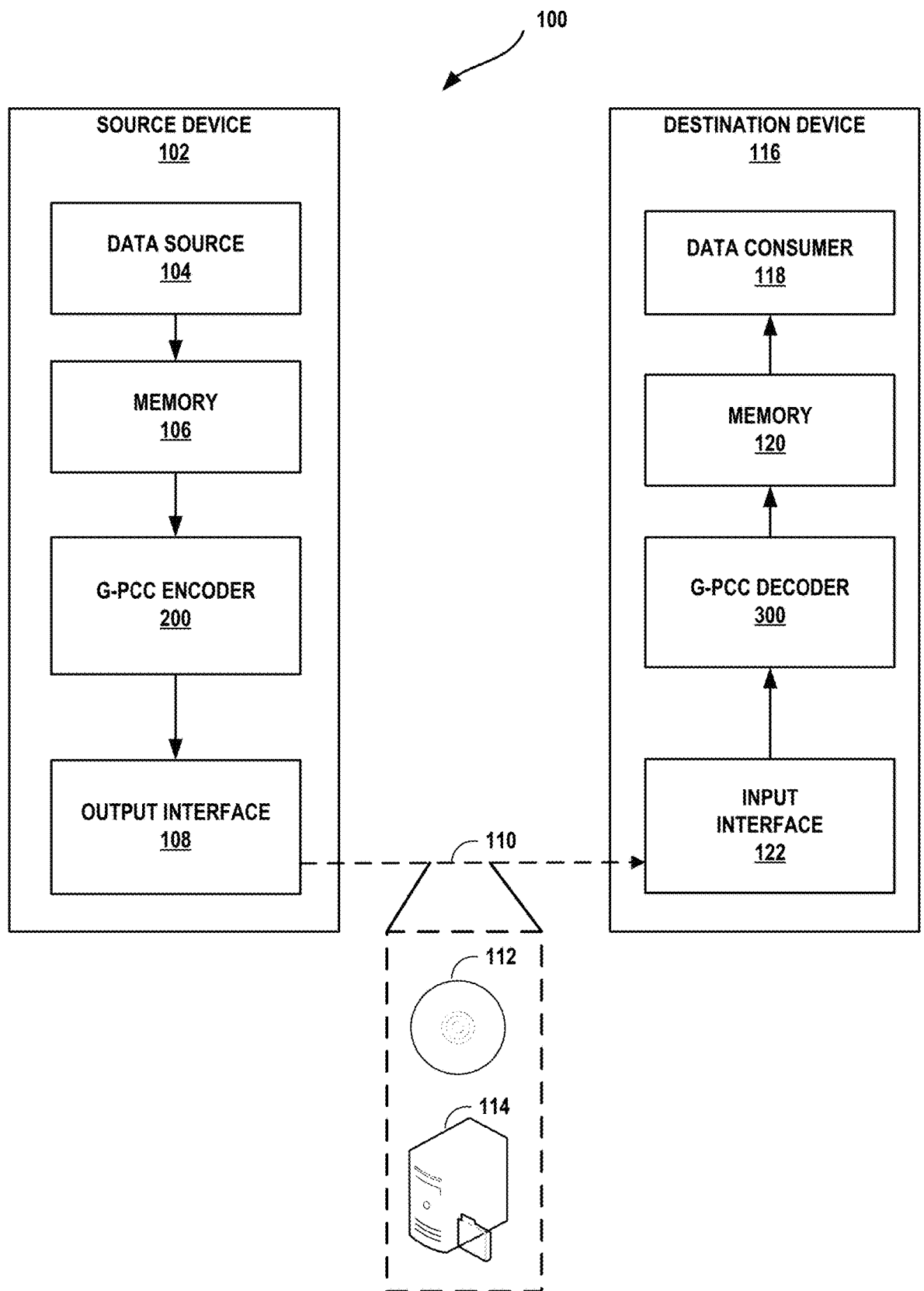
FIG. 1 is a block diagram illustrating an example encoding and decoding system that may perform the techniques of this disclosure.

A point cloud is a collection of points in a 3-dimensional space. In general, point cloud data includes any data for processing a point cloud, such as data representing the point cloud. The points may correspond to points on objects within the 3-dimensional space. Thus, point cloud data may be used to represent the physical content of a 3-dimensional space. Point cloud data may have utility in a wide variety of situations. For example, point cloud data may be used in the context of autonomous vehicles for representing the positions of objects on a roadway. In another example, point cloud data may be used in the context of representing the physical content of an environment for purposes of positioning virtual objects in an augmented reality (AR) or mixed reality (MR) application. Point cloud compression is a process for encoding and decoding point cloud data. Encoding point cloud data may reduce the amount of data required for storage and transmission of point cloud data. Geometry-based point cloud compression (G-PCC) is an approach for reducing the amount of data needed to encode or store point cloud data.

As part, of encoding point cloud data, a G-PCC encoder may generate an octree. Each node of the octree corresponds to a cuboid space. For ease of explanation, this disclosure may, in some circumstances, refer to a node and the cuboid space corresponding to the node interchangeably. Nodes of the octree can have zero child nodes or eight child nodes. In other examples, nodes can be divided into child nodes according to other tree structures. The child nodes of a parent correspond to equally sized cuboids within the cuboid corresponding to the parent node. The positions of individual points of a point cloud can be signaled relative to nodes corresponding to cuboids containing the points. If a node does not contain any points of the point cloud, the node is said to be unoccupied. If the node is unoccupied, it may not be necessary to signal additional data with respect to the node. Conversely, if a node contains one or more points of the point cloud, the node is said to be occupied.

Planar mode is a technique that may improve encoding or signaling of which nodes in an octree are occupied. Planar mode may be used when all occupied child nodes of the node are adjacent to a plane and located on one side of the plane associated, for instance, with increasing coordinate values relative to for a dimension orthogonal to the plane. For instance, planar mode may be used for a node when all occupied child nodes of the node are above or below a horizontal plane passing through a center point of the node, or planar mode may be used for a node when all occupied child nodes of the node are on a closer side or a further side of a vertical plane passing through the center point of the node. A G-PCC encoder may signal a plane position syntax element for each of an x, y, and z dimension. The plane position syntax element for an applicable dimension (e.g., an x, y, or z dimension) indicates whether the plane orthogonal to the applicable dimension is at a first position or a second position. If the plane is at the first position, the plane corresponds to a boundary of the node. If the plane is at the second position, the plane passes through a SD center of the node. Thus, for the z-dimension, a G-PCC encoder or G-PCC decoder may code a vertical plane position of a planar mode in a node of an octree that represents 3-dimensional positions of points in the point cloud.

The G-PCC coder (e.g., a G-PCC encoder or G-PCC decoder) may use arithmetic coding (e.g., context-adaptive binary arithmetic coding (CABAC)) to code plane position syntax elements. When the G-PCC coder uses arithmetic coding to code a plane position syntax element, the G-PCC coder determines a context index that indicates a context to use for arithmetic coding of the plane position syntax element. A context specifies probabilities for symbols used in arithmetic coding.

Conventional techniques for determining the context index are associated with considerable hardware requirements. For example, as part of determining the context index for determining the context index for coding the plane position of a plane orthogonal to an applicable axis, the G-PCC coder may determine a distance value that indicates a Manhattan distance between the current node and the position of a most-recently coded node that is along the applicable axis. A Manhattan distance is a sum of of the absolute differences of Cartesian coordinates of two points. The current node and the most-recently coded node along the applicable axis are nodes that have the same coordinate value for the applicable axis.

In order to determine the Manhattan distance, the G-PCC coder maintains, for each axis, a buffer for the axis that stores coordinates for the other two axes of the most-recently coded node along the axis. For example, if the axis is the x-axis, the buffer for the x-axis stores y-axis and z-axis coordinates of the most-recently coded node along the x-axis. The storage of both of these coordinates of the most-recently coded node along the current axis is associated with considerable the hardware requirements associated with determining the context index used for arithmetic coding of plane position syntax elements.

In accordance with the techniques of this disclosure, the determination of the distance value is modified to reduce the hardware requirements associated with determining the context index used for arithmetic coding of plane position syntax elements. For example, instead of using a Manhattan distance when determining a context index for arithmetic coding of a position of a plane that is through a current node and that is orthogonal to a current axis, the distance value instead represents a distance from an applicable coordinate of an applicable node to a corresponding coordinate of the current node. The applicable node is the most-recently coded node along the applicable axis (i.e., the most-recently coded node having a same coordinate in the current axis as the current node). The applicable coordinate of the applicable node is the greater of the applicable node's coordinates for the non-applicable axes (i.e., axes other than the applicable axis). The corresponding coordinate of the current node is associated with the same axis as the applicable coordinate of the applicable node.

For example, suppose the applicable axis is x, the y coordinate of the current node is 15, the z coordinate of the current node is 20, the y coordinate of the applicable node is 25, and the z coordinate of the applicable node is 40. In this example, because 40 is greater than 25, the buffer for the current axis stores the value 40 as the value of the applicable coordinate of the applicable node and does not store the value 25. In this example, the difference between the y coordinates is 10 and the difference between the z coordinates is 20. Therefore, in this example, the distance value is equal to 20. Because only the applicable coordinate is stored in the buffer for the applicable axis, the amount of data stored in the buffer for the applicable axis may be reduced by half relative to the previous way of determining the distance value.

Thus, in accordance with one or more techniques of this disclosure, a G-PCC coder (e.g., a G-PCC encoder or a G-PCC decoder) may store, in a buffer, a maximum coordinate of a pair of coordinates of an applicable node and not a lesser coordinate of the pair of coordinates of the applicable node. The applicable node is a most-recently encoded node with a same position as a current node along an applicable axis and the pair of coordinates are for axes different from the applicable axis. The G-PCC coder may determine, from among a plurality of contexts, a context for a planar mode plane position of the current node. As part of determining the context for the planar mode plane position, the G-PCC coder may determine a context index that indicates the context. As part of determining the context index, the G-PCC coder may determine a distance value representing a distance between the current node and the most-recently coded node position with the same position as the current node along the axis. The G-PCC coder may determine the distance value based on the maximum coordinate of the pair of coordinates of the most-recently coded node. The G-PCC coder may determine an increment value that indicates whether the distance value is greater than a threshold. The G-PCC coder may then determine the context index based on the increment value. The G-PCC coder may entropy code (e.g., entropy encode or entropy decode) the planar mode plane position using the determined context. For example, the G-PCC coder may perform a form of arithmetic coding, such as Context Adaptive Binary Arithmetic Coding (CABAC).

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to contexts and buffers for planar mode for G-PCC. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example, in general, other digital encoding and/or decoding devices may perform the techniques of this disclosure related to contexts and buffers for planar mode for G-PCC. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames" of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-bused data as the source data, or produce a combination alive data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, anchor encoded data, or to store data used in point cloud coding, such as buffers to store coordinates of previously coded nodes. In some examples, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In sonic, examples where output interface 108 comprises a wireless transmitter, output interface 108 and input interface 122 may be configured to transfer data, such as encoded data, according to other wireless standards, such as an IEEE. 802.11 specification, an IEEE 802.15 specification (e.g., ZigBee™), a Bluetooth™ standard, or the like. In some examples, source device 102 and/or destination device 116 may include respective system-m-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on point cloud data.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG OTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (GPCC), which directly compresses 3D geometry, i.e., position of a set of points in 3D space, and associated attribute values for each point associated with the 313 geometry). G-PCC addresses the compression of point cloud data in both Category 1 (static point clouds) and Category 3 (dynamically acquired point clouds).

A point cloud contains a set of points in a 3D space and may have attributes associated with the point. The attributes may include color information such as R, G, B or Y, Cb, Cr, or reflectance information, or other attributes. Point cloud data may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
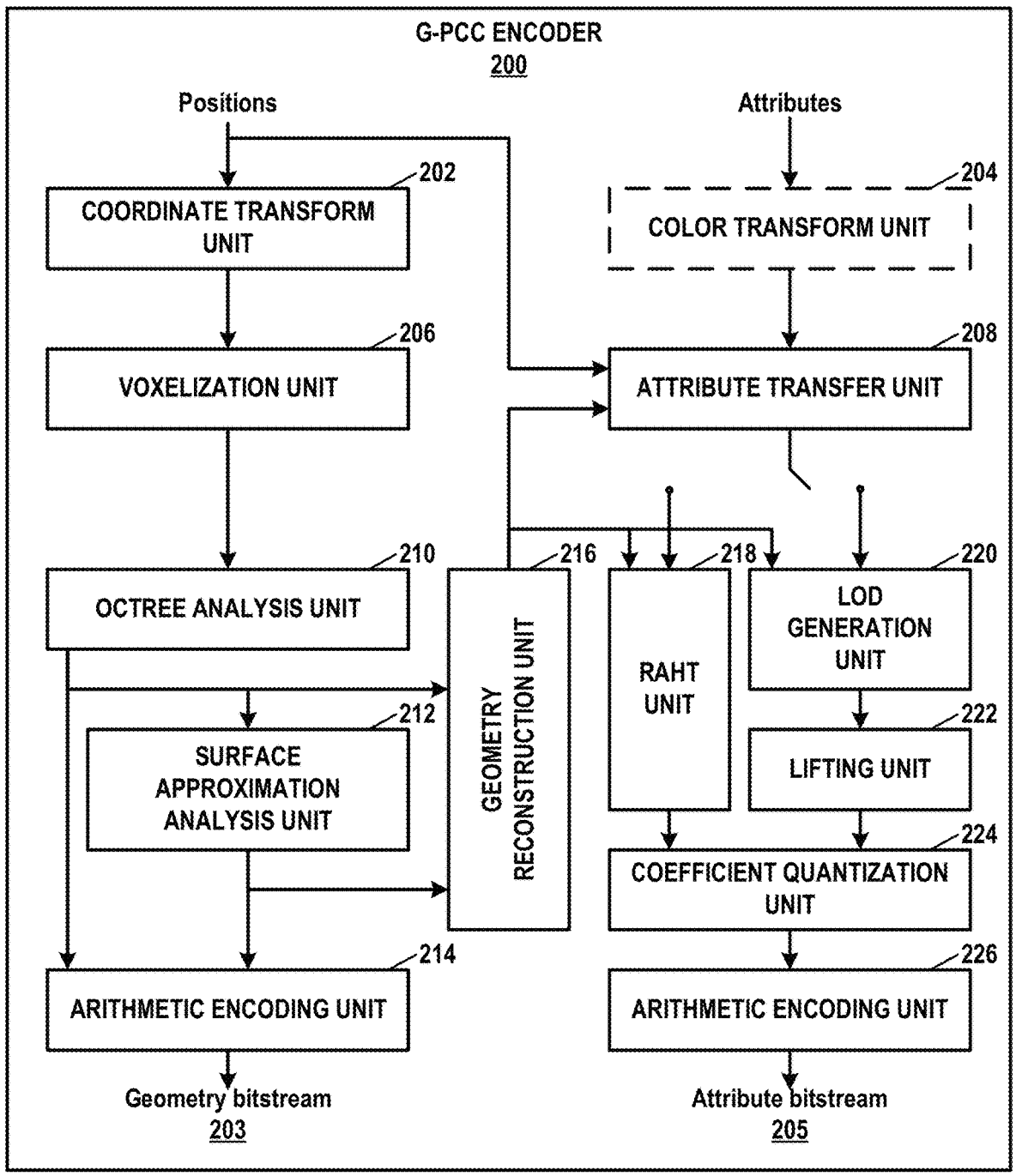
FIG. 2 is a block diagram illustrating an example Geometry Point Cloud Compression (G-PCC) encoder.
Figure 3:
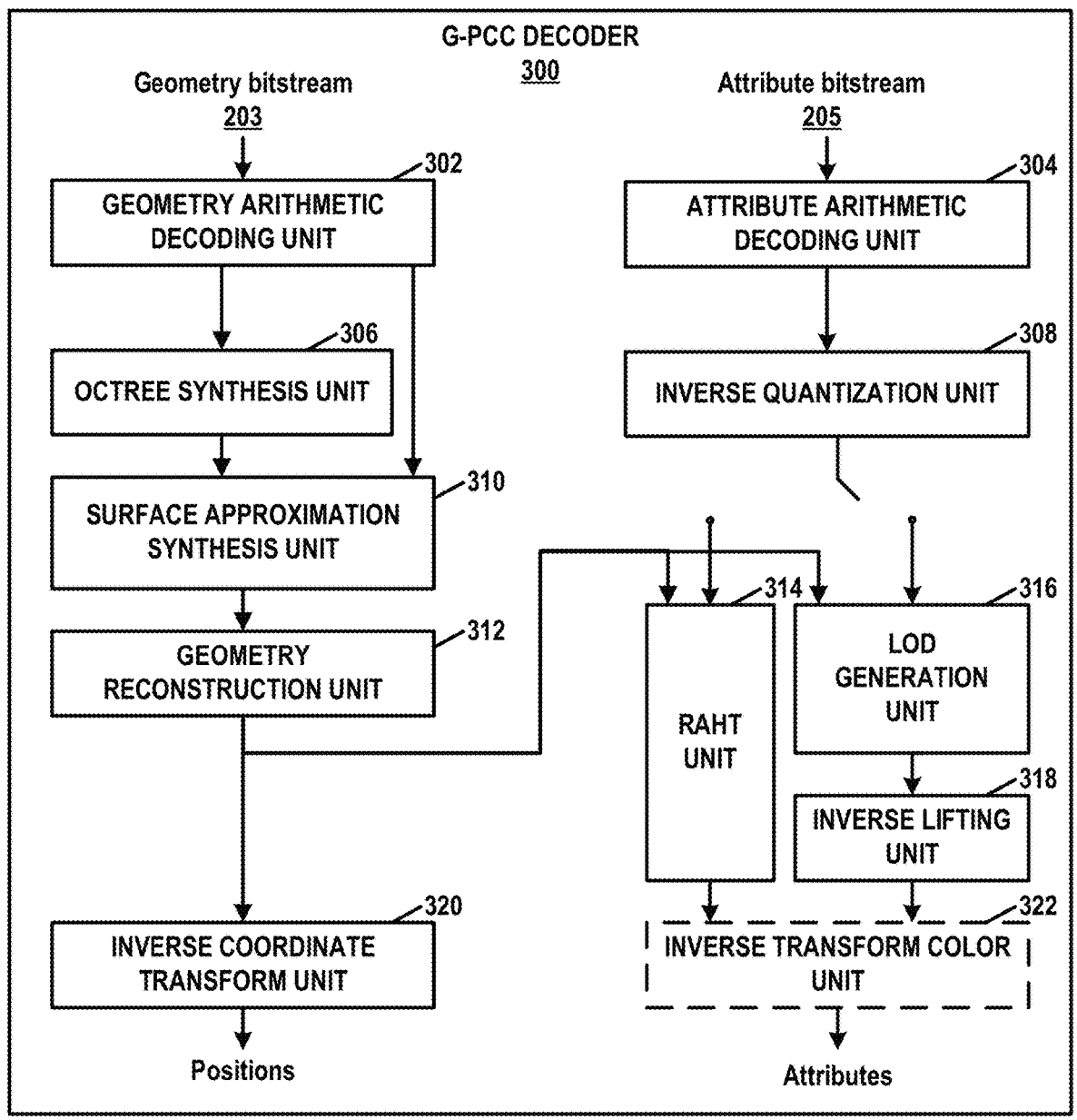
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by IBCA/IEC MPEG OTC 1/SC 29/WG 11).

In both (3-PCC encoder 200 and (3-PCC decoder 300, point cloud positions are coded first. Attribute coding depends on the decoded geometry. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry-codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree the codec also supports a direct coding mode where the 3D position of the point is encoded directly. A flag may be signaled to indicate that a direct triode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transom). RAHT and Lifting are typically used for Category 1 data, while Predicting is typically used for Category 3 data. However, either method may be used for any data, and, just like with the geometry codecs in G-PCC, the attribute coding method used to code the point cloud data is specified in the bitstream.

The coding of the attributes may be conducted in a level-of-detail (LOD), where with each level of detail a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud, Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream 203.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream 205.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream 203 and an attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

As mentioned above, G-PCC encoder 200 and G-PCC decoder 300 may apply CABAC encoding and decoding to values of syntax elements. To apply CABAC encoding to a syntax element, G-PCC encoder 200 may binarize the value of the syntax element to form a series of one or more bits, which are referred to as "bins," In addition, G-PCC encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, G-PCC encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, G-PCC encoder 200 may repeat these steps with the interval being the sub-interval associated with the value of the encoded bit. When G-PCC encoder 200 repeats these steps for the next bin, G-PCC encoder 200 may use modified probabilities based on the probabilities indicated by the identified coding context and the actual values of bins encoded.

When G-PCC decoder 300 performs CABAC decoding on a value of a syntax element, G-PCC decoder 300 may identify a coding context. G-PCC decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval. G-PCC decoder 300 may decode a bin having the value associated with the lower sub-interval. If the encoded value is within the upper sub-interval, G-PCC decoder 300 may decode a bin having the value associated with the upper sub-interval. To decode a next bin of the syntax element, G-PCC decoder 300 may repeat these steps with the interval being the sub-interval that contains the encoded value. When G-PCC decoder 300 repeats these steps for the next bin. G-PCC decoder 300 may use modified probabilities based on the probabilities indicated by the identified coding context and the decoded bins. G-PCC decoder 300 may then de-binarize the bins to recover the value of the syntax element.

Octree synthesis unit 306 may synthesize an octree based on syntax elements parsed from geometry bitstream 203. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud data from a transform domain back into an initial domain.

Additionally, in the example of FIG. 3, inverse quantization unit 308 may inverse quantize attribute values. The attribute values may be based on syntax elements obtained from an attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an ROB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Surface approximation analysis unit 212 and RANT unit 218 in FIG. 2 and surface approximation synthesis unit 310 and BAHT unit 218 in FIG. 3 are options typically used for Category 1 data. LOD generation unit 220 and lifting unit 222 in FIG. 2 and LOD generation unit 316 and inverse lifting unit 318 in FIG. 3 are options typically used for Category 3 data. All the other modules are common between Categories 1 and 3.

As noted above, the positions of individual points of a point cloud can be encoded relative to nodes containing the points. In some examples, the positions of points in a node may be encoded using an inferred direct coding mode (IDCM). When a point is signaled using IDCM, G-PCC encoder 200 encodes a point offset that indicates an offset, in a specific dimension (e.g., a vertical dimension, horizontal dimension, lateral dimension, etc.), of the point relative to an origin point of the node. A point offset may be referred to as a point position offset. G-PCC coders may determine a context and use the context in arithmetic coding of the point offset.

Planar coding mode (i.e., planar mode) was adopted at the $128^{th}$ MPEG meeting in Geneva, Switzerland. Angular coding mode (i.e., angular mode) was adopted at the $129^{th}$ MPEG meeting in Brussels, Belgium. Angular coding mode may enhance the coding efficiency of the planar mode by using the sensor characteristics of a typical LIDAR sensor. Angular coding mode is optionally used together with planar coding mode and may improve the coding of the vertical (z) plane position syntax elements by employing knowledge of positions and angles of sensing laser beams in a typical LIDAR sensor. Furthermore, the angular coding mode can optionally be used to improve the coding of vertical z-position bits in IDCM. The angular mode descriptions in the following sections are based on the original MPEG contributions documents (Sebastien Lasserre, Jonathan Taquet, "[GPCC][CE 13.22 related] An improvement of the planar coding mode," ISO/IEC JTC1/SC29/WG11 MPEG/m50642, Geneva, CFI, October 2019, and Sebastien Lasserre, Jonathan Taquet, "[GPCC] CE 13.22 report on angular mode," ISO/IEC JTC1/SC29/WG11 MPEG/m51594, Brussels, Belgium, January 2020) and the GPCC DIS text (G-PCC DIS, ISO/TEC JTC1/SC29/WG11 w19522, Teleconference, July 2020 (hereinafter, w19522).

Figure 4:
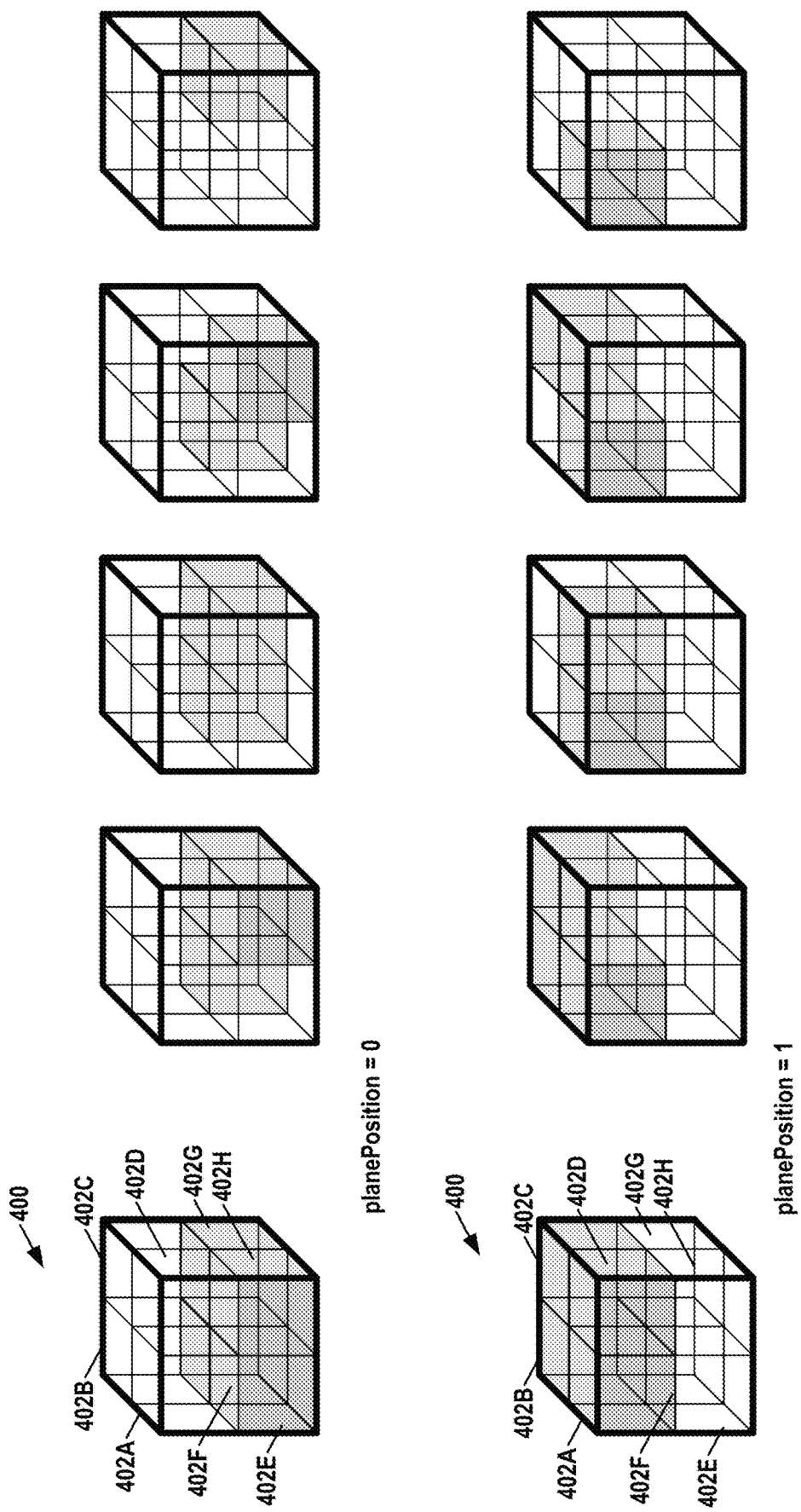
FIG. 4 is a conceptual diagram illustrating example planar occupancy in a vertical direction.

FIG. 4 is a conceptual diagram illustrating example planar occupancy in a vertical direction. In the example of FIG. 4, a node 400 is partitioned into eight child nodes. Child nodes 402 may be occupied or unoccupied. In the example of FIG. 4, occupied child nodes are shaded. When one or more child nodes 402A-402D are occupied and none of child nodes 402E-402H are occupied, G-PCC encoder 200 may signal a plane position (planePosition) syntax element with a value of 1 to indicate that all occupied child nodes are adjacent on a positive side (i.e., a side of increasing z-coordinates) of a plane of the minimum z coordinate of node 400. When one or more child nodes 402E-402H are occupied and none of child nodes 402A-402D are occupied, G-PCC encoder 200 may signal a plane position (planePosition) syntax element with a value of 0 to indicate that all occupied child nodes are adjacent on a positive side of a plane of a midpoint z coordinate of node 400. In this way, the plane position syntax element may indicate a vertical plane position of a planar mode in node 400.

The azimuthal coding mode (i.e., azimuthal mode) was adopted at the 130$^{th}$ MPEG teleconference meeting. The azimuthal coding mode is similar to the angular mode and extends the angular mode to the coding of the (x) and (y) plane position syntax elements of the planar mode and improves the coding of the x- or y-position bits in IDCM. In a separate contribution at the 131$^{st}$ MPEG teleconference meeting, the number of contexts used in the azimuthal mode was significantly reduced. Because of the similarities between angular coding mode and azimuthal coding mode, "angular mode" and "angular coding mode" may also refer to azimuthal mode in sections below.

Only some nodes in an octree may be eligible to be coded using the angular mode. The following text describes an example process for determining whether a node is eligible to be coded using the angular mode.

3.2 Planar Coding Mode 3,2.1 Eligibility of a Node for Planar Coding Mode

Explicit coding of occupancy planes is conditioned.

The array PlanarRate, with elements PlanarRate [k], for k=0 . . . 2, is an estimate of the probability that the occupancy of a node forms a single plane perpendicular to the k-th axis.

The variable localDensity is an estimate of the mean number of occupied children in a node.

The variable NumNodesUntilPlanarUpdate counts the number of nodes to be parsed before updating PlanarRate and LocalDensity.

At the start of parsing a geometry_octree syntax structure. PlanarRate and LocalDensity are initialised as follows:

```
for (k = 0; k < 3; k++)
    PlanarRate[k] = 1024
LocalDensity = 4096
NumNodesUntilPlanarUpdate = 0
```

At the start of parsing each geometry_octree_node syntax structure,

NumNodesUntilPlanarUpdate is decremented, if Num-NodesUntilPlanarUpdate is less than zero, PlanarRate and LocalDensity are updated as follows:

The number of occupied sibling nodes is determined and used to update the LocalDensity estimate:

```
let numSiblings = NodeNumChildren[depth −
    1] [sNp] [tNp] [vNp]
LocalDensity = (255 × LocalDensity + 1024 ×
    numSiblings) >> 8
```

The number of nodes until the next update is:

NumNodesUntilPlanarUpdate=numSiblings−1

The parent node's occupancy information is used to determine, along each axis, the presence of a single occupied plane and to update the corresponding planar probability estimate PlanarRate[k].

```
let parentOccupancy = GeometryNodeOccupancy[depth −
    1] [sNp] [tNp] [vNp]
let planeMasks0 = { 0xf0, 0xcc, 0xaa }
let planeMasks1 = { 0x0f, 0x33, 0x55 }
for (k = 0; k < 3; k++) {
    let plane0 = (parentOccupancy & planeMaks0[k]) != 0
    let plane1 = (parentOccupancy & planeMaks1[k]) != 0
    let hasSinglePlane = plane0 ^ plane1
    PlanarRate[k] = (255 × PlanarRate[k] + 256 ×
hasSinglePlane + 128) >> 8
}
```

At the start of parsing each geometry_octree_node syntax structure, it is determined for each axis if the current node is eligible to signal plane information. The output of this process is the array PlanarEligible, with elements PlanarEligible[k], for k=0 . . . 2. First, PlanarRate is used to determine the order, planeOrder[k], of the three planes from most to least likely according to Table 16.

Then, PlanarEligible is set as follows:

```
for (k = 0; k < 3; k++) {
    if (EffectiveNodeSizeLog2[k] <= 0)
        PlanarEligible[k] = 0
    else if (!geom_tree_coded_axis_flag[depth][k])
        PlanarEligible[k] = 0
    else if (!geom_planar_enabled_flag)
        PlanarEligible[k] = 0
    else if (XXX angular mode linkage XXX)
        PlanarEligible[k] = XXX
    else if (localDensity >= 3 × 1024)
        PlanarEligible[k] = 0
    else
        PlanarEligible[k] = PlanarRate[k] >
geom_planar_th[planeOrder[k]]
}
```

TABLE 16

Determination of the values of planeOrder[k] from planarRate[k]

| Condition | planeOrder[0] | planeOrder[1] | planeOrder[2] |
| --- | --- | --- | --- |
| planeRate[0] ≥ plane Rate[1] ≥ planeRate[2] | 0 | 1 | 2 |
| planeRate[0] ≥ planeRate[2] > planeRate[1] | 0 | 2 | 1 |
| planeRate[1] > planeRate[0] ≥ planeRate[2] | 1 | 0 | 2 |
| planeRate[1] > planeRate[2] > planeRate[0] | 2 | 0 | 1 |
| planeRate[2] > planeRate[0] ≥ planeRate[1] | 1 | 2 | 0 |

TABLE 16-continued

Determination of the values of planeOrder[k] from planarRate[k]

| Condition | planeOrder[0] | planeOrder[1] | planeOrder[2] |
|---|---|---|---|
| planeRate[2] > planeRate[1] > planeRate[0] | 2 | 1 | 0 |

Furthermore, a G-PCC coder may use a buffer to track the locations (e.g., coordinates) of previously coded nodes that were coded using the planar mode. The locations coordinates) of such previously coded nodes are stored in a buffer. The following text from w19522 describes tracking the locations (e.g., coordinates) of previously coded nodes that were coded using the planar mode.

3.2.2 Buffer Tracking the Closest Nodes Along an Axis

The arrays PlanarPrevPos, PlanarPlaneOffset, IsPlanarNode record information about previously decoded geometry tree nodes for use in the determination of ctxIdx for the syntax element plane_position. When either geometry_planar_enabled_flag is equal to 0 or planar_buffer_disabled_flag is equal to 1, the arrays are not used by the decoding process.

In this process, the variable axisIdx is used to represent one of the three coded axes, the variable axisPos represents the position of a node along the axisIdx-th axis. Values of axisPos are in the range 0 . . . 0x3fff.

The array IsPlanarNode, with values IsPlanarNode[axisIdx][axisPos] indicates whether the most recently decoded node with an axisIdx-th position component equal to axisPos is planar in the plane perpendicular to the axisIdx-th axis.

The array PlanarPrevPos, with values PlanarPrevPos[axisIdx][axisPos][k] identities the k-th component of the most recently decoded node with an axisIdx-th position component equal to axisPos. [note: for any value of axisIdx] only two of three values of k are used.

The array PlanarPlaneOffset, with values PlanarPlaneOffset[axisIdx][axisPos] indicates the value of plane_position[axisIdx] for the most recently decoded node with an axisIdx-th position component equal to axisPos.

At the start of each geometry tree level, each element of the arrays PlanarPrevPos and IsPlanarNode is initialized to 0.

After decoding each geometry_planar_mode_data syntax structure with parameters childIdx and axisIdx, the arrays PlanarPrevPos, PlanarPlane and IsPlanarNode are updated as follows:

The variable axisPos representing a position along the axisIdx-th axis is derived as follows:
if (axisIdx==0) axisPos=sN & 0x3fff
if (axisIdx==1) axisPos=tN & 0x3fff
if (axisIdx==2) axisPos=vN & 0x3fff The array entries corresponding to the node are updated as follows:

```
PlanarPrevPos[axisIdx][axisPos][0] = (sN >> 1) & 0x7f
PlanarPrevPos[axisIdx][axisPos][1] = (tN >> 1) & 0x7f
PlanarPrevPos[axisIdx][axisPos][2] = (vN >> 1) & 0x7f
if (is_planar_flag[axisPos])
    PlanarPlane[axisIdx][axisPos] = plane_position[axisIdx]
Note: PlanarPlane = PlanarPlaneOffset and is also referred
to by PrevPlane below
IsPlanarNode[axisIdx][axisPos] = is_planar_flag[axisIdx]
```

The G-PCC coder may determine a context index for the is_planar_flag syntax element and may entropy code the is_planar_flag syntax element using a context indicated by the determined context index. The following text from w19522 describes a process for determining the context index for the is_planar_flag syntax element.

3.2.2 Determination of ctxIdx for the Syntax Element is_planar_flag

The inputs to this process are:
the variable childIdx identifying the child of the current node.
the variable axisIdx identifying the axis normal to a plane, and
the position (sN, tN; vN) of the current node within a geometry tree level.

The output of this process is the variable ctxIdx. The value of ctxIdx is set equal to axisIdx and no further processing is performed.

Furthermore, the G-PCC coder may determine a context index for a planar mode plane position. The G-PCC coder may perform arithmetic coding on the planar mode plane position using the context indicated by the determined context index. The following text from w19522 describes a process for determining the context index for the planar mode plane position. Note that the following is based on w19522 and includes some fixes corresponding with TMC13v11 (indicated with <d> . . . </d> tags to indicate deletion and <i> . . . </i> to indicate insertion).

3.2.4 Determination of ctxIdx for the syntax element plane_position

The inputs to this process are:
the variable axisIdx identifying the axis normal to a plane, and
the position (sN, tN, vN) of the current node within a geometry tree level.

The output of this process is the variable ctxIdx.

<d>When planar_buffer_disabled_flag is equal to 1, the value of ctxIdx is set equal to 0 and no further processing is performed by this process. Otherwise, the remainder of this clause applies.</d>

The variable axisPos indicates the 14 least significant position bits of the current node along the axisIdx-th axis:
if (axisIdx==0) axisPos=sN & 0x3fff
if (axisIdx==1) axisPos=tN & 0x3fff
if (axisIdx==2) axisPos=vN & 0x3fff The variable dist represents the Manhattan distance between the current node and the most recently decoded node position with the same value of axisPos along the axisIdx-th axis. It is derived as follows:

```
dist = 0
for (k = 0; k < 3; k++)
    if (k != axisIdx) {
        a = PlanarPrevPos[axisIdx][axisPos][k]
        if (<d>axisIdx</d> <i>k</i> == 0) b = (sN >> 1) & 0x7f
        if (<d>axisIdx</d> <i>k</i> == 1) b = (tN >> 1) & 0x7f
        if (<d>axisIdx</d> <i>k</i> == 2) b = (vN >> 1) & 0x7f
        dist += Abs(a − b)
    }
```

The variable neighOccupied indicates whether there is an occupied node that both neighbors the current node along the axisIdx-th axis. It is derived as follows:

neighOccupied=(NeighbourPattern>>2×axisIdx) & 3
[Editor comment: Verify pattern]

<i>When planar_buffer_disabled_flag is equal to 1, the value IsPlanarNode[axisIdx][axisPos] is set equal to 1 and the values of dist and prevPlane[axisIdx][axisPos] are set equal to 0 (see TMC13v11). </i>

The context index ctxIdx is derived as follows:

```
if (!IsPlanarNode[axisIdx][axisPos])
    ctxIdx = 0
<i>Note: IsPlanarNode buffer (see section 3.2.2)</i>
else {
    prevPlane = PrevPlane[axisIdx][axisPos]
<i>Note: PrevPlane = PlanarPlane = PlanarPlaneOffset buffer
(see section 3.2.2)</i>
    distCtxInc = (dist > 1) + (dist > 8)
    ctxIdx = axisIdx + 6 × neighOccupied + 2 × distCtxInc + prevPlane + 1
}
```

In the text above, the value NeighbourPattern is a value that indicates a neighborhood occupancy pattern. Section 7.4.3.5 of w19522 describes a process for determining the value NeighbourPattern.

As specified above, the derivation of the context indices for coding the plane_position syntax element in case the angular coding mode is not used for the current node involves significant complexity. For example, in the case that tracking of the closest nodes to a current node for coding the planar mode flag and plane position syntax element of the current node is used (e.g., when planar_buffer_disabled_flag is equal to 0), the TMC13v11 software uses 72 contexts (24 per axis) for coding the plane position syntax element (e.g., plane_position). In the case that tracking of the closest nodes to the current node for coding the planar mode flag and plane position syntax element of the current node is disabled (e.g., when planar_buffer_disabled_flag is equal to 1), the TMC13v11 software uses 12 contexts for coding the plane position syntax element. In another example of how the derivation of the context indices for coding the plane position syntax element involves significant complexity when the current node is not coded using the angular coding mode, the planar buffer size (i.e., the size of a buffer used for storage of coordinates of previously coded nodes) used by the TMC13v11 software is very large (e.g., more than 700 k bits), which is expensive for hardware implementations of G-PCC coders.

This disclosure describes techniques that may address one or more of these issues. In other words, the techniques of this disclosure may reduce the complexity of deriving a context index for coding a plane position syntax element. In some examples, reducing this complexity may accelerate the process of encoding and decoding point cloud data. In some examples, reducing this complexity may reduce the costs of hardware implementations of G-PCC coders by reducing the size of the planar buffer. One or more techniques and examples disclosed in this document may be applied independently or combined.

In accordance with a first example technique of this disclosure, the number of contexts used for coding planar mode plane positions (e.g., plane_position syntax elements) may be reduced by reducing the number of contexts per axis without checking neighboring node occupancy. In other words, when determining a context for coding a plane position of a current node, a G-PCC coder (e.g., G-PCC encoder 200 or G-PCC decoder 300) does not check whether any neighboring node of the current node is occupied. The following text describes changes to w19522 in accordance with the first example technique of this disclosure. In the following text and throughout this disclosure, deletion is marked with <d> . . . </d> tags and insertion is marked with </i> tags.

Reduced Contexts Per Axis for Coding Plane_Position Without Checking Neighboring Node Occupancy The context index ctxIdx without checking the neighbour occupancy is derived as follows:

```
<d>neighOccupied = (NeighbourPattern >> 2 × axisIdx) & 3</d>
if (!IsPlanarNode[axisIdx][axisPos]])
    ctxIdx = 0
else {
    prevPlane = PrevPlane[axisIdx][axisPos]
    distCtxInc = (dist > 1) + (dist > 8)
    ctxIdx = axisIdx <d>+ 6 × neighOccupied</d>+ 2 × distCtxInc + prevPlane + 1
}
```

As shown in the text above, a G-PCC coder does not determine a value of the variable "neighOccupied" and does not use "neighOccupied" in determining the value of the context index ctxIdx. The variable neighOccupied indicates whether there is an occupied node that both neighbors the current node along the axisIdx-th axis. Because the G-PCC coder does not use the variable "neighOccupied" in determining the value of the context index, the total number of values that the context index can have is reduced.

In accordance with a second example technique of this disclosure, the planar buffer size (i.e., the size of a buffer (i.e., a planar buffer) that stores coordinates of previously coded nodes for purposes of coding plane positions of nodes) may be reduced by reducing the bit depths of the coordinates stored in the buffer. Reducing the bit depths of the coordinates reduces the number of bits of the previous node position to be stored in the planar buffer. The following text indicates changes to w19522 in accordance with the second example technique of this disclosure.

PlanarPrevPos[axisIdx][axisPos][0]=(sN>><i>3</i>) & 0x<i>f8</i>

PlanarPrevPos[axisIdx][axisPos][1]=(tN>><i>3</i>) & 0x<i>f8</i>

PlanarPrevPos[axisIdx][axisPos][2]=(vN>><i>3</i>) & 0x<i>f8</i>

In an alternative version, the second example technique of this disclosure may be implemented as follows, PlanarPrevPos[axisIdx][axisPos][0]=(sN>>& 0xf8)>>3
PlanarPrevPos[axisIdx][axisPos][1]=(tN>>0xf8)>>3
PlanarPrevPos[axisIdx][axisPos][2]=(vN>>0xf8)>>3

In this example, the following bits are retained:

. . . <d>b9 b8</d>b7 b6 b5 b4 b3 <d>b2 b1 b0</d>

Instead of the following, as provided in w19522:

. . . <d>b9 b8</d>b7 b6 b5 b4 b3 b2 b1 <d>b0</d>

Thus, in the second example technique of this disclosure, the G-PCC coder (e.g., G-PCC encoder 200 or G-PCC decoder 300) may retain the fourth through eighth most significant bits (e.g., bits b3, b4, b5, b6, and b7) of the coordinates of a previously coded node and discard the three least significant bits (e.g., bits b0, b1, b2) of the coordinates of the previously coded node.

For example, in the second example technique, the G-PCC coder may apply a hit-mask (e.g., bit-mask 0xf8) to retain the fourth through eight most significant bits. Then, the G-PCC coder may apply a right-shift operation (e.g., right-shift operation>>3) to discard (or delete) the three least significant bits. Because the right-shift operation may be applied onto the results obtain after applying the bit-mask, the G.-PCC coder may obtain a bit sequence which carries the retained fourth through eighth most significant bits on the five least significant hit positions. Because the G-PCC coder reduces the bit depths of the coordinates of the previous node position can have, a complexity of the context derivation process is reduced.

In a third example technique of this disclosure, the number of contexts per axis for coding a plane position is reduced through use of a simplified distance criterion. For instance, in accordance with the third example technique of this disclosure, the distance criterion in the context derivation as follows:

```
neighOccupied = (NeighbourPattern >> 2 × axisIdx) & 3
if (!IsPlanarNode[axisIdx][axisPos])
    ctxIdx = 0
else {
    prevPlane = PrevPlane[axisIdx][axisPos]
    <d>distCtxInc = (dist > 1) + (dist > 8)</d>
    <i>distCtxInc = (dist > 1) or alternatively (dist > 2) or
    (dist > value)</i>
    ctxIdx = axisIdx + 6 × neighOccupied + 2 × distCtxInc +
    prevPlane + 1
}
```

In the text above, "value" is a numerical value. Thus, in the third example technique, the increment value (distCtxInc) can only have a value of 0 or 1. In contrast, if the increment value were determined as (dist >1)+(dist >8), the increment value has a range from 0 to 2. Because the increment value has a smaller range in the third example technique, the context index (ctxIdx) also has a smaller range. Therefore, the number of contexts used for coding the plane position is reduced in the third example technique, thereby resulting in a reduced complexity of the context derivation process.

In a fourth example technique of this disclosure, the planar buffer size is reduced by storing a maximum of previous node position coordinates, e.g., instead of multiple coordinates of a previously coded node. For instance, in w19522, the hollowing coordinate values of a previously coded node are stored in the planar buffer (e.g., PlanarPrevPos) as follows:

PlanarPrevPos[axisIdx][axisPos][0]=(sN>>1) & 0x7f
PlanarPrevPos[axisIdx][axisPos][1]=(tN>>1) & 0x7f
PlanarPrevPos[axisIdx][axisPos][2]=(vN>>1) & 0x7f Furthermore, in w19522, the coordinate (axisPos) of the current node along the applicable axis (i.e., the axis orthogonal to the plane whose position is indicated by the plane position syntax element) is determined as:

if (axisIdx==0) axisPos=sN & 0x3fff
if (axisIdx==1) axisPos=tN & 0x3fff
if (axisIdx==2) axisPos=vN & 0x3fff In w19522, the distance variable (dist) is computed as follows, where axisIdx, is an index of the applicable axis:

```
dist = 0
for (k = 0; k < 3; k++)
    if (k != axisIdx) {
        a = PlanarPrevPos[axisIdx][axisPos][k]
        if (k == 0) b = (sN >> 1) & 0x7f
        if (k == 1) b = (tN >> 1) & 0x7f
        if (k == 2) b = (vN >> 1) & 0x7f
        dist += Abs(a - b)
    }
```

Note that in the computation of dist, the coordinates with axisIdx different from the current axisIdx (i.e., the index of the applicable axis) are used only and stored in the planar buffer. For example, if axisIdx is equal to 2, then the G-PCC coder uses the two coordinate values stored in the planar buffer with axisIdx equal to 0 and 1, respectively, to compute dist. In accordance with the fourth example technique of this disclosure, the G-PCC coder only stores the maximum coordinate of the coordinates of the previously coded node in the planar buffer, which results in the following computation of dist:

```
dist = 0
a = 0
b = 0
for (k = 0; k < 3; k++)
    if (k != axisIdx) {
        aa = PlanarPrevPos[axisIdx][axisPos][k]
        if (k == 0) bb = (sN >> 1) & 0x7f
        if (k == 1) bb = (tN >> 1) & 0x7f
        if (k == 2) bb = (vN >> 1) & 0x7f
        <i>if (aa > a) a = aa</i>
        <i>if (bb > b) b = bb</i>
    }
<i>dist = Abs(a - b)</i>
```

In this manner, the fourth example technique of this disclosure may reduce the storage requirements for the coordinates of the previously coded node by half. Although the fourth example technique of this disclosure was described with respect to determining values in the planar buffer using the process of w19522, the values in the planar buffer may be determined using the process described with respect to the second example technique of this disclosure. Moreover, the distance value determined in the fourth example technique of this disclosure may be used in the process for determining the context increment (distCtxInc) and context index (ctxIdx) as described in the first and third example techniques of this disclosure.

Figure 5:
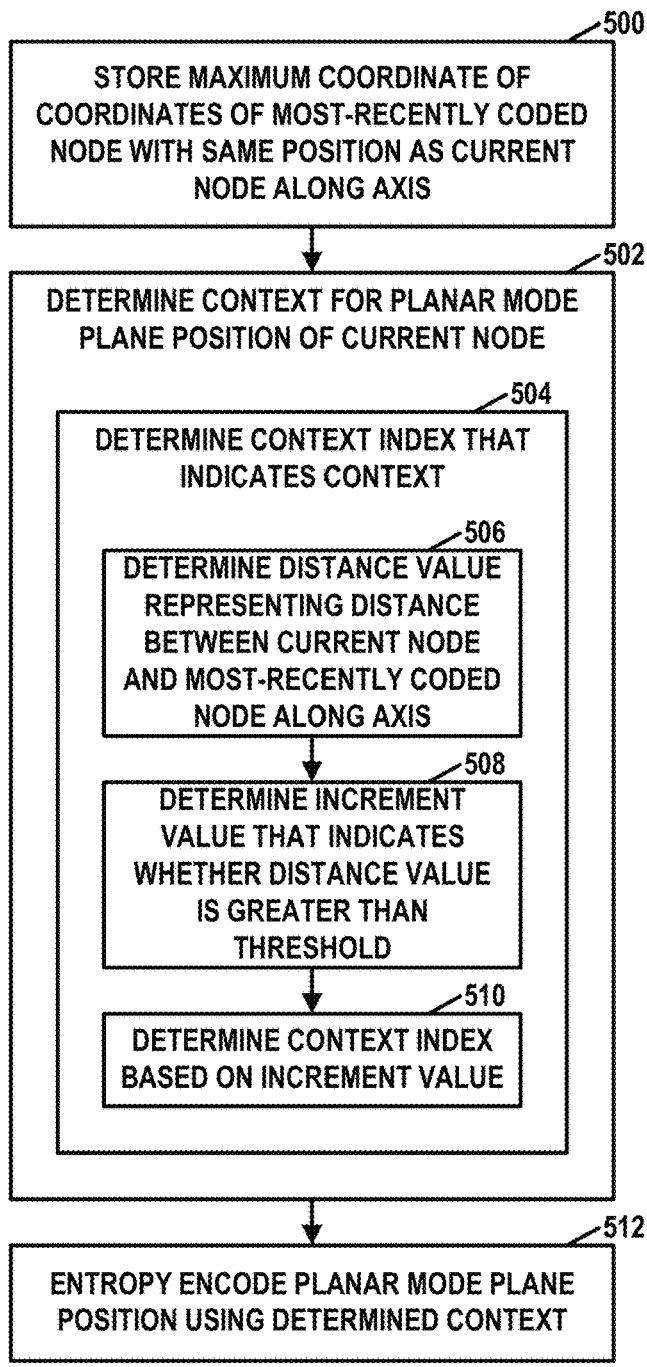
FIG. 5 is a flowchart of an example operation for encoding a planar mode plane position, in accordance with one or more techniques of this disclosure.

FIG. 5 is a flowchart of an example operation for encoding a planar mode plane position, in accordance with one or more techniques of this disclosure. For instance, the operation shown in the example of FIG. 5 is in accordance with at least the fourth example technique of this disclosure. The flowcharts of this disclosure are provided as examples. Other examples that are in accordance with the techniques of this disclosure may include more, fewer, or different actions.

In the example of FIG. 5. G-PCC encoder 200 may store, in a buffer (e.g., the planar buffer), a maximum coordinate of a pair of coordinates (i.e., whichever coordinate of the pair of coordinates is greater) of an applicable node and not a lesser coordinate of the pair of coordinates of the applicable node (500). The applicable node is the most-recently encoded node with a same position as a current node along an applicable axis and the pair of coordinates are for axes different from the applicable axis. In some examples, such as examples consistent with the second technique of this disclosure, when storing the maximum coordinate of the coordinates of the applicable node retaining the fourth through eighth most significant bits of the maximum coordinate of the coordinates of the applicable node and discarding the three least significant bits of the maximum coordinate of the coordinates of the applicable node.

Furthermore, G-PCC encoder 200 may determine, from among a plurality of contexts, a context for a planar mode plane position of the current node (502). The planar mode plane position is a position of a plane that is orthogonal to the applicable axis. As part of determining the context for the planar mode plane position. G.-PCC encoder 200 may determine a context index that indicates the context (504). As part of determining the context index, G-PCC encoder 200 may determine, based on the maximum coordinate of the pair of coordinates of the applicable node and a greater coordinate of a pair of coordinates of the current node along the axes different from the applicable axis, a distance value representing a distance between the current node and the most-recently encoded node position with the same position as the current node along the axis (506). For instance, G-PCC encoder 200 may determine the distance value as:

```
dist = 0
a = 0
b = 0
for (k = 0; k < 3; k++)
    if (k != axisIdx) {
        aa = PlanarPrevPos[axisIdx][axisPos][k]
        if (k == 0) bb = (sN >> 1) & 0x7f
        if (k == 1) bb = (tN >> 1) & 0x7f
        if (k == 2) bb = (vN >> 1) & 0x7f
        if (aa > a) a = aa
        if (bb > b) b = bb
    }
dist = Abs(a - b)
```

In the text above, PlanarPrevPos[axisIdx][axisPos][k], indicates the maximum coordinate of the coordinates of the applicable node (i.e., the closest most recently coded node along the applicable axis, which is indicated by axisPos) on a k. Because only the maximum coordinate of the coordinates of the applicable node is stored in PlanarPrevPos, only one of value of PlanarPrevPos[axisIdx][axisPos][k], where k is 0 . . . 2 may have a non-zero value. Thus, two slots in PlanarPrevPos[axisIdx][axisPos] are zero and one slot in PlanarPrevPos[axisIdx][axisPos] stored the maximum coordinate of the coordinates of the applicable node. For example, if the applicable axis is the s axis and the t axis coordinate of the applicable node is greater than the v axis coordinate of the applicable node, only PlanarPrevPos[axisIdx][axisPos][1] may have a non-zero value. At the end of the "for" loop, the value a is equal to a greater coordinate of the pair of coordinates of the current node along the axes different from the applicable axis.

Furthermore, in the example of FIG. 5. G-PCC encoder 200 may determine an increment value that indicates whether the distance value is greater than a threshold (508). For example, G-PCC encoder 200 may determine the increment value is distCtxInc=dist>1). In other words. G-PCC encoder 200 may determine the increment value as being equal to either 1 or 0 based on whether the distance value is greater than or less than 1.

G-PCC encoder 200 may determine the context index based on the increment value (510). For example. G-PCC encoder 200 may determine the context index as ctxIdx=axisIdx+6×neighOccupied+2×distCtxInc+prevPlane+1. In some examples, such as examples consistent with the first example technique of this disclosure, G-PCC encoder 200 may determine the context index as ctxIdx=axisIdx+2 distCtxInc+prevPlane+1. Thus, in such examples, G-PCC encoder 200 may determine the context index without checking a neighbor occupancy.

G-PCC encoder 200 (e.g., arithmetic encoding unit 214) may entropy encode the planar mode plane position using the determined context (512). For example, G-PCC encoder 200 may perform CABAC encoding on a syntax element indicating the planar mode plane position.

In some examples, G-PCC encoder 200 may encode at least one point in a point cloud based on the planar mode plane position. For example, G-PCC encoder 200 may encode points of the current node using IDCM. More specifically, in this example, G-PCC encoder 200 determines a point offset syntax element indicating an offset of a point relative to an origin point of the current node. G-PCC encoder 200 may also determine a context for the point offset syntax element based on the planar mode plane position of the current node. G-PCC encoder 200 may use the determined context to entropy encode (e.g., CABAC encode) the point offset syntax element.

Figure 6:
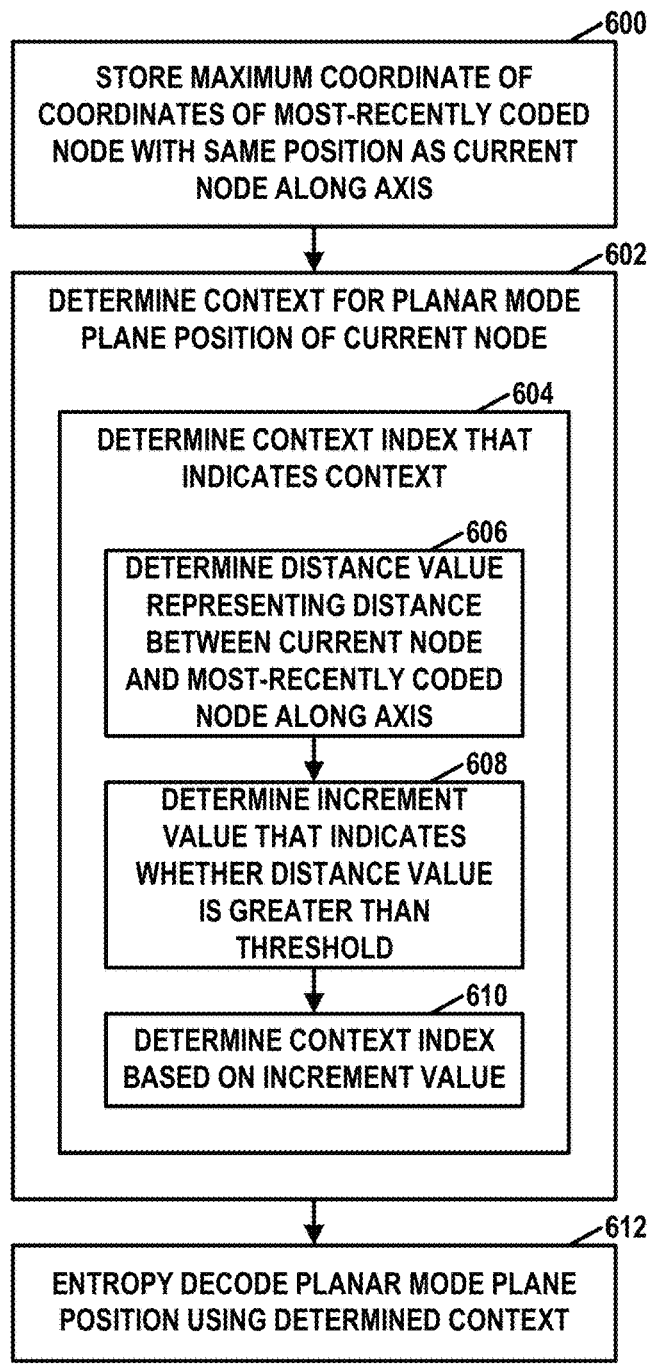
FIG. 6 is a flowchart of an example operation for decoding a planar mode plane position, in accordance with one or more techniques of this disclosure.

FIG. 6 is a flowchart of an example operation for decoding a planar mode plane position, in accordance with one or more techniques of this disclosure. In the example of FIG. 6, G-PCC decoder 300 may store, in a buffer, a maximum coordinate of a pair of coordinates of an applicable node and not a lesser coordinate of the pair of coordinates of the applicable node (600). The applicable node is the most-recently decoded node with a same position as a current node along an applicable axis and the pair of coordinates are for axes different from the applicable axis. In some examples, such as examples consistent with the second technique of this disclosure, when storing the maximum coordinate of the coordinates of the applicable node retaining the fourth through eighth most significant bits of the maximum coordinate of the coordinates of the applicable node and discarding the three least significant bits of the maximum coordinate of the coordinates of the applicable node.

Furthermore, G-PCC decoder 300 may determine, from among a plurality of contexts, a context for a planar mode plane position of the current node (602). As part of determining the context for the planar mode plane position, G-PCC decoder 300 may determine a context index that indicates the context (604). As part of determining the context index. G-PCC decoder 300 may determine, based on the maximum coordinate of the pair of coordinates of the applicable node and a greater coordinate of a pair of coordinates of the current node along the axes different from the applicable axis, a distance value representing a distance between the current node and the most-recently encoded node position with the same position as the current node along the axis (606). G-PCC decoder 300 may determine the distance value in accordance with any of the examples provided elsewhere in this disclosure, including with respect to how G-PCC encoder 200 determines the distance value as described with respect to FIG. 5.

Furthermore, in the example of FIG. 6, G-PCC decoder 300 may determine an increment value that indicates whether the distance value is greater than a threshold (608). For example, G-PCC decoder 300 may determine the increment value is distCtxInc=(dist>1). In other words, G-PCC decoder 300 may determine the increment value as being equal to either 1 or 0 based on whether the distance value is greater than or less than 1.

G-PCC decoder 300 may determine the context index based on the increment value (610). For example, G-PCC decoder 300 may determine the context index as ctxIdx=axisIdx+6×neighOccupied+2×distCtxInc+prevPlane+1. In some examples, such as examples consistent with the first example technique of this disclosure, G-PCC decoder 300 may determine the context index as ctxIdx=axisIdx+2×distCtxInc+prevPlane+1. Thus, in such examples. G-PCC decoder 300 may determine the context index without checking a neighbor occupancy.

G-PCC decoder 300 (e.g., geometry arithmetic decoding unit 302) may entropy decode the planar mode plane position using the determined context (612). For example, G-PCC decoder 300 may perform CABAC decoding on a syntax element indicating the planar mode plane position.

In some examples, G-PCC decoder 300 may decode at least one point in point cloud data based on the planar mode plane position. For example, G-PCC decoder 300 may decode a point of the current node using IDCM. More specifically, in this example, a point offset syntax element indicates an offset of the point relative to an origin point of the current node. G-PCC decoder 300 may determine a context for the point offset syntax element based on the planar mode plane position of the current node. G-PCC decoder 300 may use the determined context to entropy decode (e.g., CABAC decode) a point offset syntax element. In this way, as part of reconstructing the point cloud data. G-PCC decoder 300 may determine positions of one or more points of the point cloud data based on the planar mode plane position. Moreover, G-PCC decoder 300 may use the planar mode plane position of the current node to determine occupancy of child nodes of the current node. Thus, G-PCC decoder 300 may determine positions of points of the point cloud data in the sense that G-PCC decoder 300 may determine which child nodes include points and which child nodes do not include points.

Figure 7:
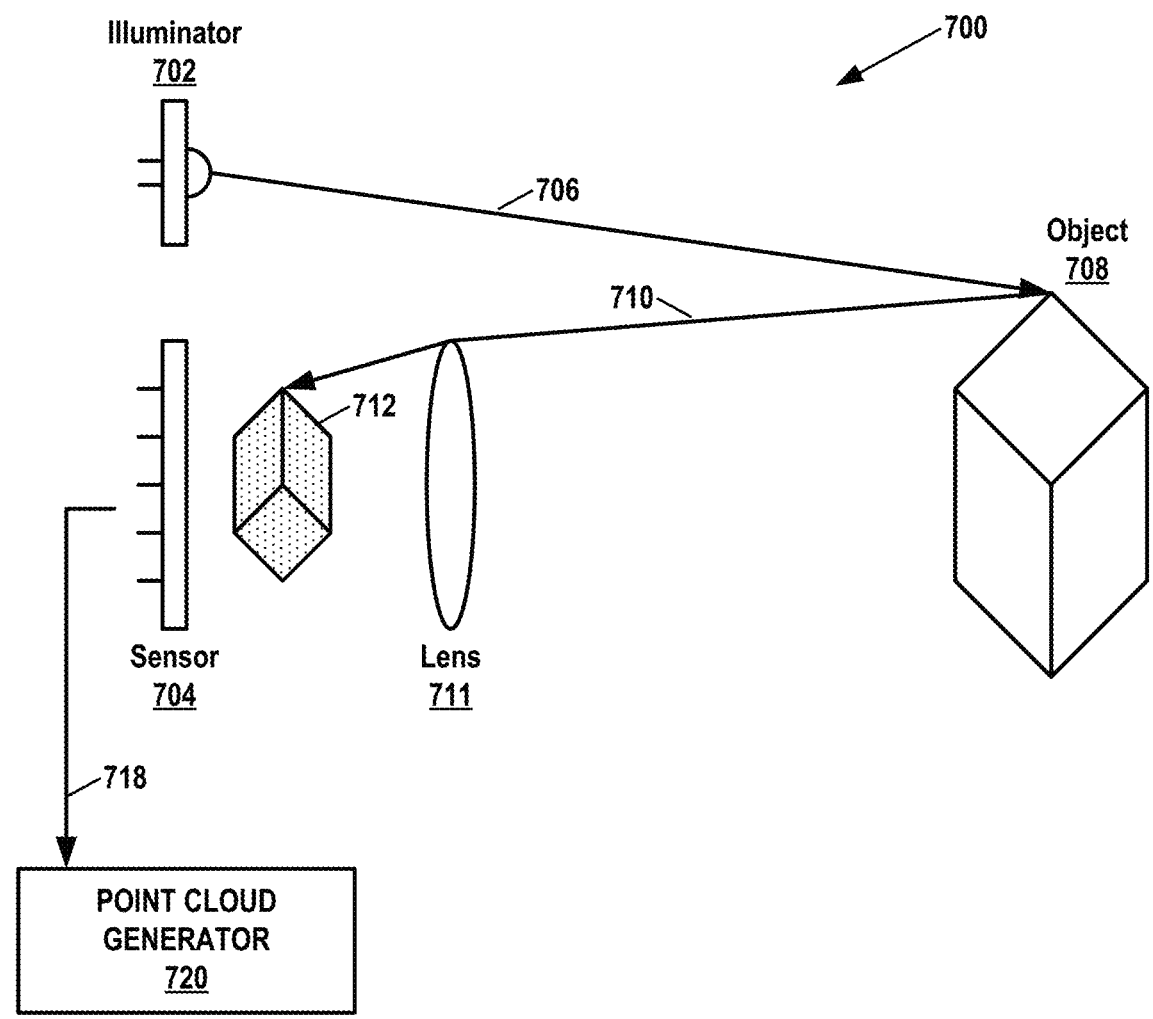
FIG. 7 is a conceptual diagram illustrating an example range-finding system that may be used with one or more techniques of this disclosure.

FIG. 7 is a conceptual diagram illustrating an example range-finding system 700 that may be used with one or more techniques of this disclosure. In the example of FIG. 7, range-finding system 700 includes an illuminator 702 and a sensor 704. Illuminator 702 may emit light 706. In some examples, illuminator 702 may emit light 706 as one or more laser beams. Light 706 may be in one or more wavelengths, such as an infrared wavelength or a visible light wavelength. In other examples, light 706 is not coherent, laser light. When light 706 encounters an object, such as object 708, light 706 creates returning light 710. Returning light 710 may include backscattered and/or reflected light. Returning light 710 may pass through a lens 711 that directs returning light 710 to create an image 712 of object 708 on sensor 704. Sensor 704 generates signals 718 based on image 712. Image 712 may comprise a set of points (e.g., as represented by dots in image 712 of FIG. 7).

In some examples, illuminator 702 and sensor 704 may be mounted on a spinning structure so that illuminator 702 and sensor 704 capture a 360-degree view of an environment. In other examples, range-finding system 700 may include one or more optical components (e.g., mirrors, collimators, diffraction gratings, etc.) that enable illuminator 702 and sensor 704 to detect ranges of objects within a specific range up to 360-degrees). Although the example of FIG. 7 only shows a single illuminator 702 and sensor 704, range-finding system 700 may include multiple sets of illuminators and sensors.

In some examples, illuminator 702 generates a structured light pattern. In such examples, range-finding system 700 may include multiple sensors 704 upon which respective images of the structured light pattern are formed. Range-finding system 700 may use disparities between the images of the structured light pattern to determine a distance to an object 708 from which the structured light pattern backscatters. Structured light-based range-finding systems may have a high level of accuracy (e.g., accuracy in the sub-millimeter range), when object 708 is relatively close to sensor 704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 700 is a time of flight (ToF)-based system. In some examples where range-finding system 700 is a ToF-based system, illuminator 702 generates pulses of light. In other words, illuminator 702 may modulate the amplitude of emitted light 706. In such examples, sensor 704 detects returning light 710 from the pulses of light 706 generated by illuminator 702. Range-finding system 700 may then determine a distance to object 708 from which light 706 backscatters based on a delay between when light 706 was emitted and detected and the known speed of light in air. In some examples, rather than (or in addition to) modulating the amplitude of the emitted light 706, illuminator 702 may modulate the phase of the emitted light 706. In such examples, sensor 704 may detect the phase of returning light 710 from object 708 and determine distances to points on object 708 using the speed of light and based on time differences between when illuminator 702 generated light 706 at a specific phase and when sensor 704 detected returning light 710 at the specific phase.

In other examples, point cloud data may be generated without using illuminator 702. For instance, in some examples, sensors 704 of range-finding system 700 may include two or more optical cameras. In such examples, range-finding system 700 may use the optical cameras to capture stereo images of the environment, including object 708. Range-finding system 700 may include a point cloud generator 720 that may calculate the disparities between locations in the stereo images. Range-finding system 700 may then use the disparities to determine distances to the locations shown in the stereo images. From these distances, point cloud generator 720 may generate point cloud data.

Sensors 704 may also detect other attributes of object 708, such as color and reflectance information. In the example of FIG. 7, a point cloud generator 720 may generate point cloud data based on signals 718 generated by sensor 704. Range-finding system 700 and/or point cloud generator 720 may form part of data source 104 (FIG. I). Hence, point cloud data generated by range-finding system 700 may be encoded and/or decoded according to any of the techniques of this disclosure.

Figure 8:
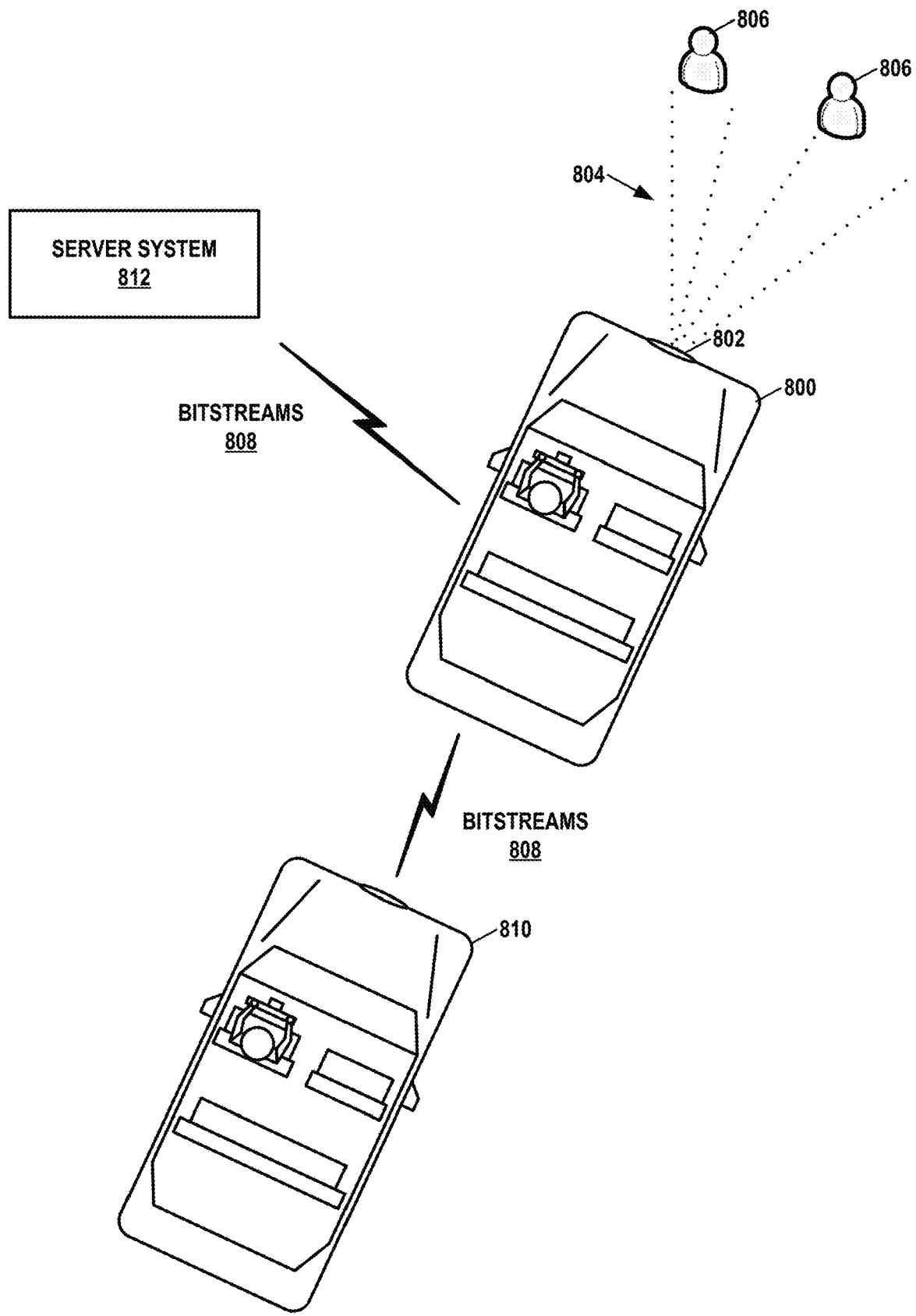
FIG. 8 is a conceptual diagram illustrating an example vehicle-based scenario in which one or more techniques of this disclosure may be used.

FIG. 8 is a conceptual diagram illustrating an example vehicle-based scenario in which one or more techniques of this disclosure may be used. In the example of FIG. 8, a vehicle 800 includes a range-finding system 802. Range-finding system 802 may be implemented in the manner discussed with respect to FIG. 8. Although not shown in the example of FIG. 8, vehicle 800 may also include a data source, such as data source 104 (FIG. 1), and a G-PCC encoder, such as G-PCC encoder 200 (FIG. 1). In the example of FIG. 8, range-finding system 802 emits laser beams 804 that reflect off pedestrians 806 or other objects in a roadway. The data source of vehicle 800 may generate point cloud data based on signals generated by range-finding system 802. The G-PCC encoder of vehicle 800 may encode the point cloud data to generate bitstreams 808, such as geometry bitstream 203 (FIG. 2) and attribute bitstream 205 (FIG. 2). Bitstreams 808 may include many fewer bits than the unencoded point cloud data obtained by the G-PCC encoder.

An output interface of vehicle 800 (e.g., output interface 108 (FIG. 1) may transmit bitstream 808 to one or more other devices. Bitstreams 808 may include many fewer bits than the unencoded point cloud data obtained by the G-PCC encoder. Thus, vehicle 800 may be able to transmit bitstreams 808 to other devices more quickly than the unencoded point cloud data. Additionally, bitstreams 808 may require less data storage capacity.

In the example of FIG. 8, vehicle 800 may transmit bitstreams 808 to another vehicle 810. Vehicle 810 may include a G-PCC decoder, such as G-PCC decoder 300 (FIG. 1). The G-PCC decoder of vehicle 810 may decode bitstreams 808 to reconstruct the point cloud data. Reconstructing the point cloud data may include determining coordinates of points of the point cloud data and/or determining attribute values for points of the point cloud data. Vehicle 810 may use the reconstructed point cloud data for various purposes. For instance, vehicle 810 may determine based on the reconstructed point cloud data that pedestrians 806 are in the roadway ahead of vehicle 800 and therefore start slowing down, e.g., even before a driver of vehicle 810 realizes that pedestrians 806 are in the roadway. Thus, in some examples, vehicle 810 may perform an autonomous navigation operation based on the reconstructed point cloud data.

Additionally or alternatively, vehicle 800 may transmit bitstreams 808 to a server system 812. Server system 812 may use bitstreams 808 for various purposes. For example, server system 812 may store bitstream 808 for subsequent reconstruction of the point cloud data. In this example, server system 812 may use the point cloud data along with other data vehicle telemetry data generated by vehicle 800) to train an autonomous driving system. In other example, server system 812 may store bitstream 808 for subsequent reconstruction for forensic crash investigations (e.g., if vehicle 800 collides with pedestrians 806).

The techniques of this disclosure may further reduce the complexity and hardware costs associated with determining a context for coding a planar mode plane position. For instance, with respect to FIG. 8, this may accelerate the abilities of vehicle 800 to encode point cloud data, accelerate the abilities of server system 812 and vehicle 810 to decode point cloud data, and may reduce the costs of vehicles 800, 810 and server system 812.

Figure 9:
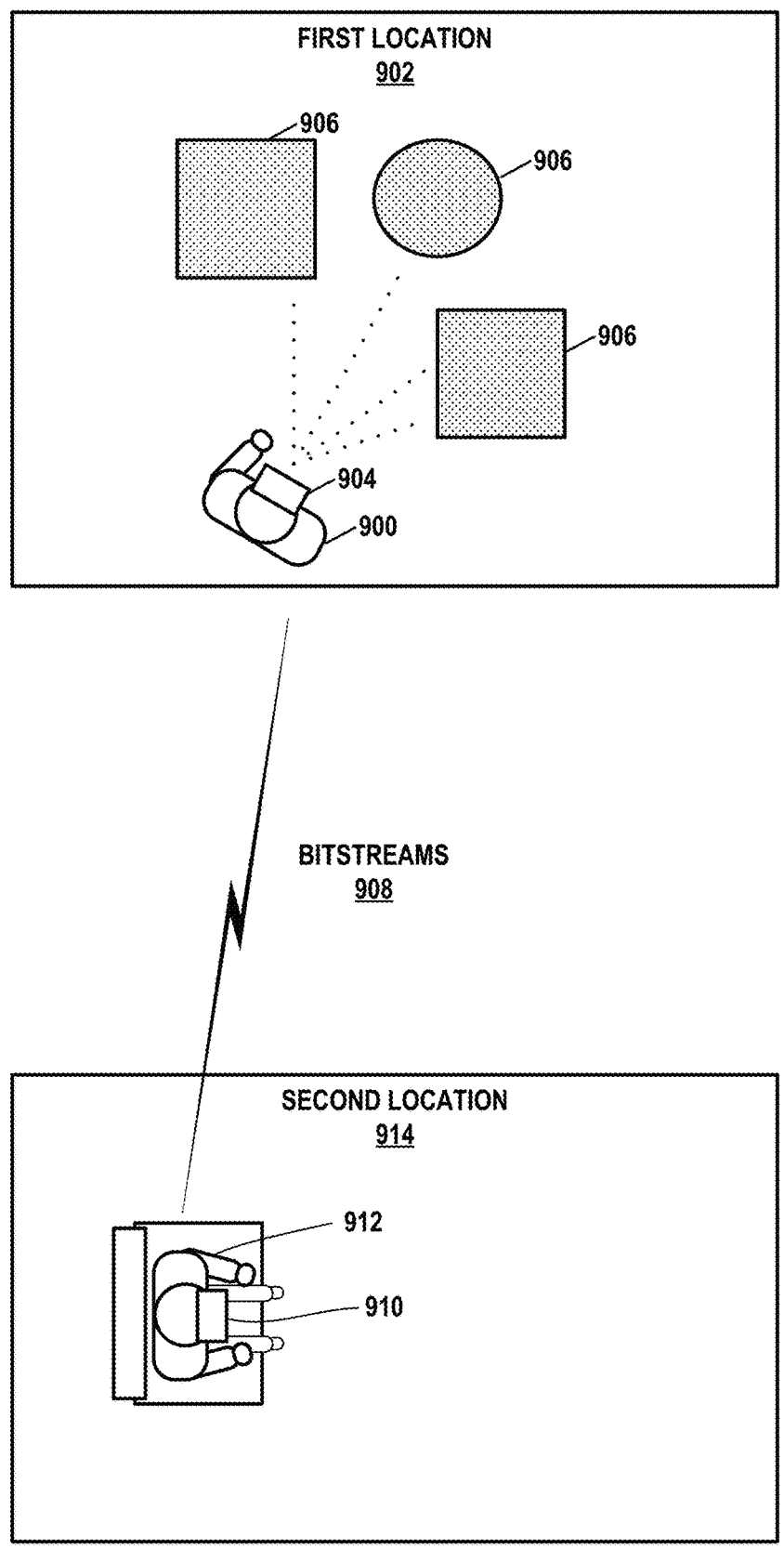
FIG. 9 is a conceptual diagram illustrating an example extended reality system in which one or more techniques of this disclosure may be used.

FIG. 9 is a conceptual diagram illustrating an example extended reality system in which one or more techniques of this disclosure may be used. Extended reality (XR) is a term used to cover a range of technologies that includes augmented reality (AR), mixed reality (MR), and virtual reality (YR.). In the example of FIG. 9, a user 900 is located in a first location 902. User 900 wears an XR headset 904. As an alternative to XR headset 904, user 900 may use a mobile device (e.g., mobile phone, tablet computer, etc.). XR headset 904 includes a depth detection sensor, such as a range-finding system, that detects positions of points on objects 906 at location 902. A data source of XR headset 904 may use the signals generated by the depth detection sensor to generate point cloud data, representing objects 906 at location 902. XR headset 904 may include a G-PCC encoder (e.g., G-PCC encoder 200 of FIG. 1) that is configured to encode the point cloud data to generate bitstreams 908.

XR headset 904 may transmit bitstreams 908 (e.g., via a network such as the Internet) to an XR headset 910 worn by a user 912 at a second location 914. XR headset 910 may decode bitstreams 908 to reconstruct the point cloud data. XR headset 910 may use the point cloud data to generate an XR visualization (e.g., an AR, MR, VR visualization) representing objects 906 at location 902. Thus, in some examples, such as when XR headset 910 generates an VR visualization, user 912 may have a 3D immersive experience of location 902. In some examples. XR headset 910 may determine a position of a virtual object based on the reconstructed point cloud data. For instance, XR headset 910 may determine, based on the reconstructed point cloud data, that an environment (e.g., location 902) includes a flat surface and then determine that a virtual object (e.g., a cartoon character) is to be positioned on the flat surface, XR headset 910 may generate an XR visualization in which the virtual object is at the determined position. For instance, XR headset 910 may show the cartoon character sitting on the flat surface.

The techniques of this disclosure may further reduce the complexity and hardware costs associated with determining a context for coding a planar mode plane position. For instance, with respect to FIG. 9, this may accelerate the abilities of XR headset 904 to encode point cloud data, accelerate the abilities of XR headset 910 to decode point cloud data, and may reduce the costs of XR headsets 940 and 910.

Figure 10:
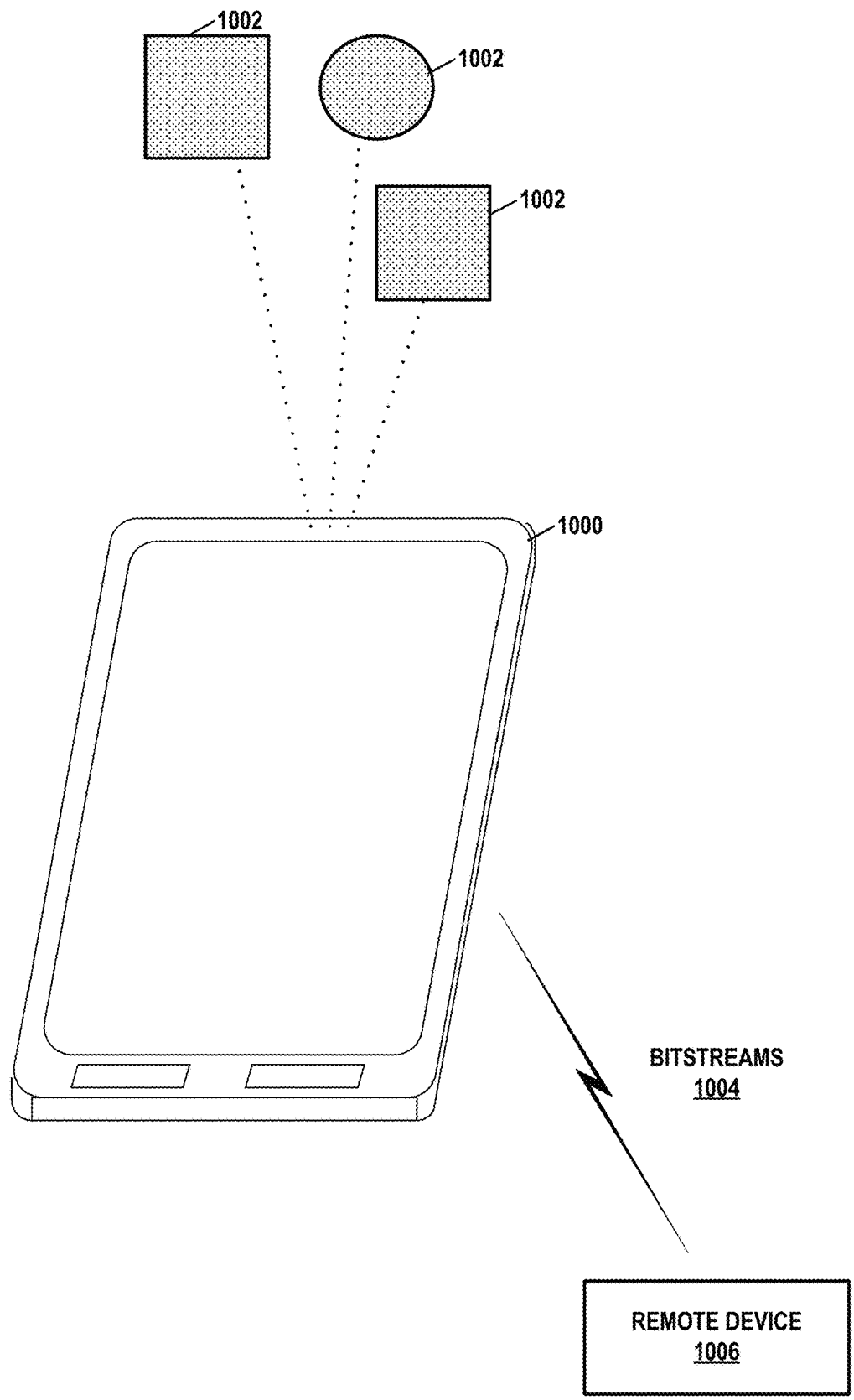
FIG. 10 is a conceptual diagram illustrating an example mobile device system in which one or more techniques of this disclosure may be used.

FIG. 10 is a conceptual diagram illustrating an example mobile device system in which one or more techniques of this disclosure may be used. In the example of FIG. 10, a mobile device 1000, such as a mobile phone or tablet computer, includes a range-finding system, such as a LIDAR system, that detects positions of points on objects 1002 in an environment of mobile device 1000. A data source of mobile device 1000 may use the signals generated by the depth detection sensor to generate point cloud data representing objects 1002. Mobile device 1000 may include a G-PCC encoder (e.g., G-PCC encoder 200 of FIG. 1) that is configured to encode the point cloud data to generate bitstreams In the example of FIG. 10, mobile device 1000 may transmit bitstreams to a remote device 1006, such as a server system or other mobile device. Remote device 1006 may decode bitstreams 1004 to reconstruct the point cloud data. Remote device 1006 may use the point cloud data for various purposes. For example, remote device 1006 may use the point cloud data to generate a map of environment of mobile device 1000. For instance, remote device 1006 may generate a map of an interior of a building based on the reconstructed point cloud data. In another example, remote device 1006 may generate imagery (e.g., computer graphics) based on the point cloud data. For instance, remote device 1006 may use points of the point cloud data as vertices of polygons and use color attributes of the points as the basis for shading the polygons. In some examples, remote device 1006 may use the reconstructed point cloud data for facial recognition or other security applications.

The techniques of this disclosure may further reduce the complexity and hardware costs associated with determining a context for coding a planar mode plane position. For instance, with respect to FIG. 10, this may accelerate the abilities of mobile device 1000 to encode point cloud data and may reduce the costs of mobile device 1000.

Examples in the various aspects of this disclosure may be used individually or in any combination.

The following is a non-limiting list of examples that arc consistent with one or more techniques of this disclosure.

Aspect 1A: A method of coding point cloud data includes determining a context for a planar mode plane position from a plurality of contexts, wherein determining the context for the planar mode comprises determining, without checking a neighbor occupancy, a context index that indicates the context; entropy coding the planar mode plane position using the determined context; and coding at least one point in a point cloud based on the planar mode plane position.

Aspect 2A: A method of coding point cloud data includes determining a context for a planar mode plane position from a plurality of contexts, wherein determining the context for the planar mode comprises determining a context index that indicates the context, wherein determining the context index comprises: determining a distance value representing a distance between a current node and a most-recently coded node position with a same position as the current node along an axis; determining an increment value that indicates whether the distance value is greater than a threshold; and determining the context index based on the increment value; entropy coding the planar mode plane position using the determined context and coding at least one point in a point cloud based on the planar mode plane position.

Aspect 3A: The method of aspect 2A, wherein the method further comprises storing a maximum value of coordinates of the most-recently coded node in a buffer, and wherein determining the distance value comprises determining the distance value based on the maximum value of coordinates of the most-recently coded node stored in the buffer.

Aspect 4A: The method of any of aspects 2A or 3A, wherein determining the context for the planar mode plane position comprises determining the context index without checking a neighbor occupancy.

Aspect 5A: The method of any of aspects 1A-4A, further comprising generating the point cloud.

Aspect 6A: A device for processing a point cloud, the device comprising one or more means for performing the method of any of aspects 1A-5A, Aspect 7A: The device of aspect 6A, wherein the one or more means comprise one or more processors implemented in circuitry.

Aspect 8A: The device of any of aspects 6A or 7A, further comprising a memory to store the data representing the point cloud.

Aspect 9A: The device of any of aspects 6A-8A, wherein the device comprises a decoder.

Aspect 10A: The device of any of aspects 6A-9A, wherein the device comprises an encoder.

Aspect 11A: The device of any of aspects 6A-10A, further comprising a device to generate the point cloud.

Aspect 12A: The device of any of aspects 6A-11A, further comprising a display to present imagery based on the point cloud.

Aspect 13A: A computer-readable storage medium having stored thereon instructions that, when executed, cause one or more processors to perform the method of any of aspects 1A-5A.

Aspect 1B. A method of encoding point cloud data, the method comprising: storing, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; determining, from among a plurality of contexts, a context for a planar mode plane position of the current node, wherein determining the context for the planar mode plane position comprises determining a context index that indicates the context, wherein determining the context index comprises: determining, based on the maximum coordinate of the pair of coordinates of the applicable node stored in the buffer and a greater coordinate of a pair of coordinates of the current node along the axes different from the applicable axis, a distance value representing a distance between the current node and the applicable node; determining an increment value that indicates whether the distance value is greater than a threshold; and determining the context index based on the increment value; and entropy encoding the planar mode plane position using the determined context.

Aspect 2B. The method of aspect 1B, further comprising encoding at least one point of the point cloud data based on the planar mode plane position.

Aspect 3B. The method of any of aspects 1B-2B, wherein storing the maximum coordinate of the pair of coordinates of the applicable node comprises: retaining the fourth through eighth most significant bits of the maximum coordinate of the pair of coordinates of the applicable node and discarding the three least significant bits of the maximum coordinate of the pair of coordinates of the applicable node.

Aspect 4B. The method of any of aspects 1B-3B, wherein determining the increment value comprises determining the increment value as being equal to either 1 or 0 based on whether the distance value is greater than or less than 1.

Aspect 5B. The method of any of aspects 1B-3B, further comprising generating the point cloud data.

Aspect 6B. A method of decoding point cloud data, the method comprising: storing, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; determining, from among a plurality of contexts, a context for a planar mode plane position of the current node, wherein determining the context for the planar mode plane position comprises determining a context index that indicates the context, wherein determining the context index comprises: determining, based on the maximum coordinate of the pair of coordinates of the applicable node and a greater coordinate of a pair of coordinates of the current node along the axes different from the applicable axis, a distance value representing a distance between the current node and the applicable node, determining an increment value that indicates whether the distance value is greater than a threshold; and determining the context index based on the increment value; and entropy decoding the planar mode plane position using the determined context.

Aspect 7B. The method of aspect 6B, further comprising decoding at least one point of the point cloud data based on the planar mode plane position.

Aspect 8B. The method of any of aspects 6B-7B, wherein storing the maximum coordinate of the pair of coordinates of the applicable node comprises: retaining the fourth through eighth most significant bits of the maximum coordinate of the pair of coordinates of the applicable node and discarding the three least significant bits of the maximum coordinate of the pair of coordinates of the applicable node.

Aspect 9B. The method of any of aspects 6B-8B, wherein determining the increment value comprises determining the increment value as being equal to either 1 or 0 based on whether the distance value is greater than or less than 1.

Aspect 10B. A device for encoding point cloud data, the device comprising: a buffer configured to store a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; and one or more processors implemented in circuitry, the one or more processors configured to: determine, from among a plurality of contexts, a context for a planar mode plane position of the current node, wherein the one or more processors are configured to, as part, of determining the context for the planar mode plane position, determine a context index that indicates the context, and the one or more processors are configured to, as part of determining the context index: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy encode the planar mode plane position using the determined context.

Aspect 11B. The device of aspect 10B, wherein the one or more processors are further configured to encode at least one point of the point cloud data based on the planar mode plane position.

Aspect 12B. The device of any of aspects 10B-11B, wherein the one or more processors are configured to, as part of storing the maximum coordinate of the pair of coordinates of the applicable node in the buffer, retain the fourth through eighth most significant bits of the maximum coordinate of the pair of coordinates of the applicable node and discard the three least significant bits of the maximum coordinate of the pair of coordinates of the applicable node.

Aspect 13B. The device of any of aspects 10B-12B, wherein the one or more processors are configured to, as part of determining the increment value, determine the increment value as being equal to either 1 or 0 based on whether the distance value is greater than or less than 1.

Aspect 14B. The device of any of aspects 10B-13B, further comprising display to present imagery based on the point cloud data.

Aspect 15B. The device of any of aspects 10B-14B, further comprising a device to generate the point cloud data.

Aspect 16B. The device of aspect 15B, wherein the one or more processors are configured to, as part of generating the point cloud data, generate the point cloud data based on signals from a LIDAR apparatus.

Aspect 17B. The device of any of aspects 10B-16B, wherein the device is one of a mobile phone or tablet computer.

Aspect 18B. The device of any of aspects 10B-16B, wherein the device is a vehicle.

Aspect 19B. The device of any of aspects 10B-16B, wherein the device is an extended reality device.

Aspect 20B. The device of any of aspects 10B-19B, wherein the device comprises an interface configured to transmit the point cloud data.

Aspect 21B. A device for decoding point cloud data, the device comprising: a buffer configured to store a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; and one or more processors implemented in circuitry, the one or more processors configured to: determine, from among a plurality of contexts, a context for a planar mode plane position of the current node, wherein the one or more processors are configured to, as part of determining the context for the planar mode plane position, determine a context index that indicates the context, and the one or more processors are configured to, as part of determining the context index: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy decode the planar mode plane position using the determined context.

Aspect 22B. The device of aspect 21B, wherein the one or more processors are further configured to decode at least one point of the point cloud data based on the planar mode plane position.

Aspect 23B. The device of any of aspects 21B-22B, wherein the one or more processors are configured to, as part of storing the maximum coordinate of the pair of coordinates of the applicable node to the buffer, retain the fourth through eighth most significant bits of the maximum coordinate of the pair of coordinates of the applicable node and discard the three least significant bits of the maximum coordinate of the pair of coordinates of the applicable node.

Aspect 24B. The device of any of aspects 21B-23B, wherein the one or more processors are configured to, as part of determining the increment value, determine the increment value as being equal to either 1 or 0 based on whether the distance value is greater than or less than 1.

Aspect 25B. The device of any of aspects 21B-24B, wherein the one or more processors are further configured to reconstruct the point cloud data, and wherein the one or more processors are configured to, as part of reconstructing the point cloud data, determine positions of one or more points of the point cloud data based on the planar mode plane position.

Aspect 26B. The device of aspect 25B, wherein the one or more processors are further configured to generate a map of an interior of a building based on the reconstructed point cloud data.

Aspect 27B. The device of any of aspects 25B-26B, wherein the one or more processors are further configured to perform an autonomous navigation operation based on the reconstructed point cloud data.

Aspect 28B. The device of any of aspects 25B-27B, wherein the one or more processors are further configured to generate computer graphics based on the reconstructed point cloud data.

Aspect 29B. The device of aspect 28B, wherein the one or more processors are configured to: determine a position of a virtual object based on the reconstructed point cloud data; and generate an extended reality (XR) visualization in which the virtual object is at the determined position.

Aspect 30B. The device of any of aspects 21B-29B, wherein the device is one of a mobile phone or tablet computer.

Aspect 31B. The device of any of aspects 21B-29B, wherein the device is a vehicle.

Aspect 32B. The device of any of aspects 21R-29B, wherein the device is an extended reality device.

Aspect 33B. The device of any of aspects 21B-32B, further comprising a display to present imagery based on the point cloud data.

Aspect 34B. A device for encoding point cloud data, the device comprising: means for storing a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; means for determining, from among a plurality of contexts, a context for a planar mode plane position of the current node, wherein the means for determining the context for the planar mode plane position of the current node comprises means for determining a context index that indicates the context, and the means for determining the context index comprises: means for determining, based on the maximum coordinate of the pair of coordinates of the applicable node and a greater coordinate of a pair of coordinates of the current node along the axes different from the applicable axis, a distance value representing a distance between the current node and the applicable node; means for determining an increment value that indicates whether the distance value is greater than a threshold; and means for determining the context index based on the increment value; and means for entropy encoding the planar mode plane position using the determined context.

Aspect 35B. A device for decoding point cloud data, the device comprising: means for storing a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; means for determining, from among a plurality of contexts, a context for a planar mode plane position of the current node, wherein the means for determining the context for the planar mode plane position of the current node comprises means for determining a context index that indicates the context, and the means for determining the context index comprises: means for determining, based on the maximum coordinate of the pair of coordinates of the applicable node and a greater coordinate of a pair of coordinates of the current node along the axes different from the applicable axis, a distance value representing a distance between the current node and the applicable node; means for determining an increment value that indicates whether the distance value is greater than a threshold; and means for determining the context index based on the increment value; and means for entropy decoding the planar mode plane position using the determined context.

Aspect 36B. A computer-readable storage medium having stored thereon instructions that, when executed, cause one or more processors to: store, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value, and entropy encode the planar mode plane position using the determined context.

Aspect 37B. A computer-readable storage medium having stored thereon instructions that, when executed, cause one or more processors to: store, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to: determine, based on the maximum coordinate of the pair of coordinates of the applicable node stored in the buffer and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy decode the planar mode plane position using the determined context.

Aspect 1C. A method of encoding point cloud data, the method comprising: storing, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; determining, from among a plurality of contexts, a context for a planar mode plane position of the current node, wherein determining the context for the planar mode plane position comprises determining a context index that indicates the context, wherein determining the context index comprises: determining, based on the maximum coordinate of the pair of coordinates of the applicable node stored in the buffer and a greater coordinate of a pair of coordinates of the current node along the axes different from the applicable axis, a distance value representing a distance between the current node and the applicable node; determining an increment value that indicates whether the distance value is greater than a threshold; and determining the context index based on the increment value; and entropy encoding the planar mode plane position using the determined context.

Aspect 2C. The method of aspect 1C, further comprising encoding at least one point of the point cloud data based on the planar mode plane position.

Aspect 3C. The method of aspect 1C, wherein storing the maximum coordinate of the pair of coordinates of the applicable node comprises: retaining the fourth through eighth most significant bits of the maximum coordinate of the pair of coordinates of the applicable node and discarding the three least significant bits of the maximum coordinate of the pair of coordinates of the applicable node.

Aspect 4C. The method of aspect 1C, wherein determining the increment value comprises determining the increment value as being equal to either 1 or 0 based on whether the distance value is greater than or less than 1.

Aspect 5C. The method of aspect 1C, further comprising generating the point cloud data.

Aspect 6C. A method of decoding point cloud data, the method comprising: storing, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; determining, from among a plurality of contexts, a context for a planar mode plane position of the current node, wherein determining the context for the planar mode plane position comprises determining a context index that indicates the context, wherein determining the context index comprises: determining, based on the maximum coordinate of the pair of coordinates of the applicable node and a greater coordinate of a pair of coordinates of the current node along the axes different from the applicable axis, a distance value representing a distance between the current node and the applicable node; determining an increment value that indicates whether the distance value is greater than a threshold; and determining the context index based on the increment value; and entropy decoding the planar mode plane position using the determined context.

Aspect 7C. The method of aspect 6C, further comprising decoding at least one point of the point cloud data based on the planar mode plane position.

Aspect 8C. The method of aspect 6C, wherein storing the maximum coordinate of the pair of coordinates of the applicable node comprises: retaining the fourth through eighth most significant bits of the maximum coordinate of the pair of coordinates of the applicable node and discarding the three least significant bits of the maximum coordinate of the pair of coordinates of the applicable node.

Aspect 9C. The method of aspect 6C, wherein determining the increment value comprises determining the increment value as being equal to either 1 or 0 based on whether the distance value is greater than or less than 1.

Aspect 10C. A device for encoding point cloud data, the device comprising: a buffer configured to store a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; and one or more processors implemented in circuitry, the one or more processors configured to: determine, from among a plurality of contexts, a context for a planar mode plane position of the current node, wherein the one or more processors are configured to, as part of determining the context for the planar mode plane position, determine a context index that indicates the context, and the one or more processors are configured to, as part of determining the context index: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy encode the planar mode plane position using the determined context.

Aspect 11C. The device of aspect 10C, wherein the one or more processors are further configured to encode at least one point of the point cloud data based on the planar mode plane position.

Aspect 12C. The device of aspect 10C, wherein the one or more processors are configured to, as part of storing the maximum coordinate of the pair of coordinates of the applicable node in the buffer, retain the fourth through eighth most significant bits of the maximum coordinate of the pair of coordinates of the applicable node and discard the three least significant bits of the maximum coordinate of the pair of coordinates of the applicable node, Aspect 13C. The device of aspect 10C, wherein the one or more processors are configured to, as part of determining the increment value, determine the increment value as being equal to either 1 or 0 based on whether the distance value is greater than or less than 1.

Aspect 14C. The device of aspect 10C, further comprising a display to present imagery based on the point cloud data.

Aspect 15C. The device of aspect 10C, further comprising a device to generate the point cloud data.

Aspect 16C. The device of aspect 15C, wherein the one or more processors are configured to, as part of generating the point cloud data, generate the point cloud data based on signals from a LIDAR apparatus.

Aspect 17C. The device of aspect 10C, wherein the device is one of a mobile phone or tablet computer.

Aspect 18C. The device of aspect 10C, wherein the device is a vehicle.

Aspect 19C. The device of aspects 10C, wherein the device is an extended reality device.

Aspect 20C. The device of aspect 10C, wherein the device comprises an interface configured to transmit the point cloud data.

Aspect 21C. A device for decoding point cloud data, the device comprising: a buffer configured to store a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; and one or more processors implemented in circuitry, the one or more processors configured to: determine, from among a plurality of contexts, a context for a planar mode plane position of the current node, wherein the one or more processors are configured to, as part of determining the context for the planar mode plane position, determine a context index that indicates the context, and the one or more processors are configured to, as part of determining the context index: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy decode the planar mode plane position using the determined context.

Aspect 22C. The device of aspect 21C, wherein the one or more processors are further configured to decode at least one point of the point cloud data based on the planar mode plane position.

Aspect 23C. The device of aspect 21C, wherein the one or more processors are configured to, as part of storing the maximum coordinate of the pair of coordinates of the applicable node to the buffer, retain the fourth through eighth most significant bits of the maximum coordinate of the pair of coordinates of the applicable node and discard the three least significant bits of the maximum coordinate of the pair of coordinates of the applicable node.

Aspect 24C. The device of aspect 21C, wherein the one or more processors are configured to, as part of determining the increment value, determine the increment value as being equal to either 1 or 0 based on whether the distance value is greater than or less than 1.

Aspect 25C. The device of aspect 21C, wherein the one or more processors are further configured to reconstruct the point cloud data, and wherein the one or more processors are configured to, as part of reconstructing the point cloud data, determine positions of one or more points of the point cloud data based on the planar mode plane position.

Aspect 26C. The device of aspect 25C, wherein the one or more processors are further configured to generate a map of an interior of a building based on the reconstructed point cloud data.

Aspect 27C. The device of aspect 25C, wherein the one or more processors are further configured to perform an autonomous navigation operation based on the reconstructed point cloud data.

Aspect 28C. The device of aspect 25C, wherein the one or more processors are further configured to generate computer graphics based on the reconstructed point cloud data.

Aspect 29C. The device of aspect 25, wherein the one or more processors are configured to: determine a position of a virtual object based on the reconstructed point cloud data; and generate an extended reality (XR) visualization in which the virtual object is at the determined position.

Aspect 30C. The device of aspect 21C, wherein the device is one of a mobile phone or tablet computer.

Aspect 31C. The device of aspect 21C, wherein the device is a vehicle.

Aspect 32C. The device of aspect 21C, wherein the device is an extended reality device.

Aspect 33C. The device of aspect 21C, further comprising a display to present imagery based on the point cloud data.

Aspect 34C. A device for encoding point cloud data, the device comprising: means for storing a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; means for determining, from among a plurality of contexts, a context for a planar mode plane position of the current node, wherein the means for determining the context for the planar mode plane position of the current node comprises means for determining a context index that indicates the context, and the means for determining the context index comprises: means for determining, based on the maximum coordinate of the pair of coordinates of the applicable node and a greater coordinate of a pair of coordinates of the current node along the axes different from the applicable axis, a distance value representing a distance between the current node and the applicable node; means for determining an increment value that indicates whether the distance value is greater than a threshold; and means for determining the context index based on the increment value; and means for entropy encoding the planar mode plane position using the determined context.

Aspect 35C. A device for decoding point cloud data, the device comprising: means for storing a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; means for determining, from among a plurality of contexts, a context for a planar mode plane position of the current node, wherein the means for determining the context for the planar mode plane position of the current node comprises means for determining a context index that indicates the context, and the means for determining the context index comprises: means for determining, based on the maximum coordinate of the pair of coordinates of the applicable node and a greater coordinate of a pair of coordinates of the current node along the axes different from the applicable axis, a distance value representing a distance between the current node and the applicable node; means for determining an increment value that indicates whether the distance value is greater than a threshold; and means for determining the context index based on the increment value; and means for entropy decoding the planar mode plane position using the determined context.

Aspect 36C. A computer-readable storage medium having stored thereon instructions that, when executed, cause one or more processors to: store, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to: determine, based on the maximum coordinate of the pair of coordinates of the applicable node and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy encode the planar mode plane position using the determined context.

Aspect 37C. A computer-readable storage medium having stored thereon instructions that, when executed, cause one or more processors to: store, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to: determine, based on the maximum coordinate of the pair of coordinates of the applicable node stored in the buffer and a greater coordinate of a pair of coordinates of the current node along the axes different from the applicable axis, a distance value representing a distance between the current node and the applicable node; determine an increment value that indicates whether the distance value is greater than a threshold; and determine the context index based on the increment value; and entropy decode the planar mode plane position using the determined context.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber lint (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or oilier transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding point cloud data, the method comprising:
    storing, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis;
    determining, from among a plurality of contexts, a context for a planar mode plane position of the current node, wherein determining the context for the planar mode plane position comprises determining a context index that indicates the context, wherein determining the context index comprises:
        determining a value based on a difference between a first value and a second value, the first value being the maximum coordinate of the pair of coordinates of the applicable node stored in the buffer and the second value being whichever coordinate of a pair of coordinates of the current node along the axes different from the applicable axis is greater;
        determining an increment value that indicates whether the distance value is greater than a threshold; and
        determining the context index based on the increment value; and
    entropy encoding the planar mode plane position using the determined context.

2. The method of claim 1, further comprising encoding at least one point of the point cloud data based on the planar mode plane position.

3. The method of claim 1, wherein storing the maximum coordinate of the pair of coordinates of the applicable node comprises:
    retaining the fourth through eighth most significant bits of the maximum coordinate of the pair of coordinates of the applicable node and discarding the three least significant bits of the maximum coordinate of the pair of coordinates of the applicable node.

4. The method of claim 1, wherein determining the increment value comprises determining the increment value as being equal to either 1 or 0 based on whether the value is greater than or less than 1.

5. The method of claim 1, further comprising generating the point cloud data.

6. A method of decoding point cloud data, the method comprising:
    storing, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis;

determining, from among a plurality of contexts, a context for a planar mode plane position of the current node, wherein determining the context for the planar mode plane position comprises determining a context index that indicates the context, wherein determining the context index comprises:

determining a value based on a difference between a first value and a second value, the first value being the maximum coordinate of the pair of coordinates of the applicable node stored in the buffer and the second value being whichever coordinate of a pair of coordinates of the current node along the axes different from the applicable axis is greater;

determining an increment value that indicates whether the value is greater than a threshold; and determining the context index based on the increment value; and entropy decoding the planar mode plane position using the determined context.

7. The method of claim 6, further comprising decoding at least one point of the point cloud data based on the planar mode plane position.

8. The method of claim 6, wherein storing the maximum coordinate of the pair of coordinates of the applicable node comprises:

retaining the fourth through eighth most significant bits of the maximum coordinate of the pair of coordinates of the applicable node and discarding the three least significant bits of the maximum coordinate of the pair of coordinates of the applicable node.

9. The method of claim 6, wherein determining the increment value comprises determining the increment value as being equal to either 1 or 0 based on whether the value is greater than or less than 1.

10. A device for encoding point cloud data, the device comprising:

a buffer configured to store a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis; and one or more processors implemented in circuitry, the one or more processors configured to:

determine, from among a plurality of contexts, a context for a planar mode plane position of the current node, wherein the one or more processors are configured to, as part of determining the context for the planar mode plane position, determine a context index that indicates the context, and the one or more processors are configured to, as part of determining the context index:

determine a value based on a difference between a first value and a second value, the first value being the maximum coordinate of the pair of coordinates of the applicable node stored in the buffer and the second value being whichever coordinate of a pair of coordinates of the current node along the axes different from the applicable axis is greater;

determine an increment value that indicates whether the value is greater than a threshold; and determine the context index based on the increment value; and entropy encode the planar mode plane position using the determined context.

11. The device of claim 10, wherein the one or more processors are further configured to encode at least one point of the point cloud data based on the planar mode plane position.

12. The device of claim 10, wherein the one or more processors are configured to, as part of storing the maximum coordinate of the pair of coordinates of the applicable node in the buffer, retain the fourth through eighth most significant bits of the maximum coordinate of the pair of coordinates of the applicable node and discard the three least significant bits of the maximum coordinate of the pair of coordinates of the applicable node.

13. The device of claim 10, wherein the one or more processors are configured to, as part of determining the increment value, determine the increment value as being equal to either 1 or 0 based on whether the value is greater than or less than 1.

14. The device of claim 10, further comprising a display to present imagery based on the point cloud data.

15. The device of claim 10, wherein the device is configured to generate the point cloud data.

16. The device of claim 15, wherein the one or more processors are configured to, as part of generating the point cloud data, generate the point cloud data based on signals from a LIDAR apparatus.

17. The device of claim 10, wherein the device is one of a mobile phone or tablet computer.

18. The device of claim 10, wherein the device is a vehicle.

19. The device of claim 10, wherein the device is an extended reality device.

20. The device of claim 10, wherein the device comprises an interface configured to transmit the point cloud data.

21. A device for decoding point cloud data, the device comprising:

a buffer configured to store a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis; and one or more processors implemented in circuitry, the one or more processors configured to:

determine, from among a plurality of contexts, a context for a planar mode plane position of the current node, wherein the one or more processors are configured to, as part of determining the context for the planar mode plane position, determine a context index that indicates the context, and the one or more processors are configured to, as part of determining the context index:

determine a value based on a difference between a first value and a second value, the first value being the maximum coordinate of the pair of coordinates of the applicable node stored in the buffer and the second value being whichever coordinate of a pair of coordinates of the current node along the axes different from the applicable axis is greater;

determine an increment value that indicates whether the distance value is greater than a threshold; and determine the context index based on the increment value; and entropy decode the planar mode plane position using the determined context.

22. The device of claim 21, wherein the one or more processors are further configured to decode at least one point of the point cloud data based on the planar mode plane position.

23. The device of claim 21, wherein the one or more processors are configured to, as part of storing the maximum coordinate of the pair of coordinates of the applicable node to the buffer, retain the fourth through eighth most significant bits of the maximum coordinate of the pair of coordinates of the applicable node and discard the three least significant bits of the maximum coordinate of the pair of coordinates of the applicable node.

24. The device of claim 21, wherein the one or more processors are configured to, as part of determining the increment value, determine the increment value as being equal to either 1 or 0 based on whether the value is greater than or less than 1.

25. The device of claim 21,
wherein the one or more processors are further configured to reconstruct the point cloud data, and
wherein the one or more processors are configured to, as part of reconstructing the point cloud data, determine positions of one or more points of the point cloud data based on the planar mode plane position.

26. The device of claim 25, wherein the one or more processors are further configured to generate a map of an interior of a building based on the reconstructed point cloud data.

27. The device of claim 25, wherein the one or more processors are further configured to perform an autonomous navigation operation based on the reconstructed point cloud data.

28. The device of claim 25, wherein the one or more processors are further configured to generate computer graphics based on the reconstructed point cloud data.

29. The device of claim 28, wherein the one or more processors are configured to:
determine a position of a virtual object based on the reconstructed point cloud data; and
generate an extended reality (XR) visualization in which the virtual object is at the determined position.

30. The device of claim 21, wherein the device is one of a mobile phone or tablet computer.

31. The device of claim 21, wherein the device is a vehicle.

32. The device of claim 21, wherein the device is an extended reality device.

33. The device of claim 21, further comprising a display to present imagery based on the point cloud data.

34. A device for encoding point cloud data, the device comprising:
means for storing a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis;
means for determining, from among a plurality of contexts, a context for a planar mode plane position of the current node, wherein the means for determining the context for the planar mode plane position of the current node comprises means for determining a context index that indicates the context, and the means for determining the context index comprises:
means for determining a value based on a difference between a first value and a second value, the first value being the maximum coordinate of the pair of coordinates of the applicable node and the second value being whichever coordinate of a pair of coordinates of the current node along the axes different from the applicable axis is greater;
means for determining an increment value that indicates whether the value is greater than a threshold; and
means for determining the context index based on the increment value; and
means for entropy encoding the planar mode plane position using the determined context.

35. A device for decoding point cloud data, the device comprising:
means for storing a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis;
means for determining, from among a plurality of contexts, a context for a planar mode plane position of the current node, wherein the means for determining the context for the planar mode plane position of the current node comprises means for determining a context index that indicates the context, and the means for determining the context index comprises:
means for determining a value based on a difference between a first value and a second value, the first value being the maximum coordinate of the pair of coordinates of the applicable node and the second value being whichever coordinate of a pair of coordinates of the current node along the axes different from the applicable axis is greater;
means for determining an increment value that indicates whether the value is greater than a threshold; and
means for determining the context index based on the increment value; and
means for entropy decoding the planar mode plane position using the determined context.

36. A non-transitory computer-readable storage medium having stored thereon instructions that, when executed, cause one or more processors to:
store, in a buffer, a maximum coordinate of a pair of coordinates of an applicable node and not a lesser coordinate of the pair of coordinates of the applicable node, wherein the applicable node is a most-recently encoded node with a same position as a current node along an applicable axis and the pair of coordinates are for axes different from the applicable axis;
determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to:
determine a value based on a difference between a first value and a second value, the first value being the maximum coordinate of the pair of coordinates of the applicable node stored in the buffer and the second value being whichever coordinate of a pair of coordinates of the current node along the axes different from the applicable axis is greater;

determine an increment value that indicates whether the value is greater than a threshold; and determine the context index based on the increment value; and entropy encode the planar mode plane position using the determined context.

37. A non-transitory computer-readable storage medium having stored thereon instructions that, when executed, cause one or more processors to:

store, in a buffer, a maximum coordinate of a pair of coordinates of an applicable node and not a lesser coordinate of the pair of coordinates of the applicable node, wherein the applicable node is a most-recently decoded node with a same position as a current node along an applicable axis and the pair of coordinates are for axes different from the applicable axis;

determine, from among a plurality of contexts, a context for a planar mode plane position of the current node, wherein the instructions that cause the one or more processors to determine the context for the planar mode plane position comprise instructions that, when executed, cause the one or more processors to determine a context index that indicates the context, wherein the instructions that cause the one or more processors to determine the context index comprise instructions that, when executed, cause the one or more processors to:

determine a value based on a difference between a first value and a second value, the first value being the maximum coordinate of the pair of coordinates of the applicable node stored in the buffer and the second value being whichever coordinate of a pair of coordinates of the current node along the axes different from the applicable axis is greater;

determine an increment value that indicates whether the distance value is greater than a threshold; and determine the context index based on the increment value; and entropy decode the planar mode plane position using the determined context.

* * * * *